US011902470B1

(12) United States Patent
Smith-Mickelson et al.

(10) Patent No.: US 11,902,470 B1
(45) Date of Patent: Feb. 13, 2024

(54) APPARATUSES AND METHODS INVOLVING PARKING COMMUNICATIONS

(71) Applicant: 8x8, Inc., Campbell, CA (US)

(72) Inventors: Jared Smith-Mickelson, Los Gatos, CA (US); Abhishek Jain, San Ramon, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 17/991,689

(22) Filed: Nov. 21, 2022

Related U.S. Application Data

(60) Provisional application No. 63/281,419, filed on Nov. 19, 2021.

(51) Int. Cl.
*H04M 3/523* (2006.01)
*H04M 3/51* (2006.01)
*H04M 3/428* (2006.01)

(52) U.S. Cl.
CPC ....... *H04M 3/5235* (2013.01); *H04M 3/4283* (2013.01); *H04M 3/5166* (2013.01); *H04M 3/5191* (2013.01); *H04M 2201/42* (2013.01)

(58) Field of Classification Search
None
See application file for complete search history.

(56) References Cited

U.S. PATENT DOCUMENTS

| | | | | |
|---|---|---|---|---|
| 5,754,627 A | * | 5/1998 | Butler | H04M 1/72513 455/414.1 |
| 5,970,134 A | * | 10/1999 | Highland | H04M 3/523 379/266.01 |
| 6,236,716 B1 | * | 5/2001 | Marcus | H04M 11/022 379/217.01 |
| 7,440,440 B1 | * | 10/2008 | Abichandani | H04M 3/42212 370/389 |
| 8,078,151 B2 | * | 12/2011 | Martin | H04W 4/16 455/445 |
| 2002/0130791 A1 | * | 9/2002 | Stumer | H04M 3/428 340/932.2 |
| 2004/0013255 A1 | * | 1/2004 | Williams | H04Q 3/64 379/207.02 |

(Continued)

*Primary Examiner* — Harry S Hong
(74) *Attorney, Agent, or Firm* — Crawford Maunu PLLC

(57) ABSTRACT

According to one example, the present disclosure involves a system including a data-communications server which uses client-specific sets of data that respectively indicate, for each of a plurality of remotely-situated disparate client entities, data services including data-communications call routing services and parked-call services to be provided on behalf of the client entity from among the client entities. The server is to access the client-specific sets of data (e.g., as may be stored in database of a memory circuit), and, in response, the server receives incoming calls involving user endpoint devices associated with respective ones of the client entities. These actions may be followed by the server providing the data services for the incoming calls in a manner consistent with the client-specific sets of data, and conveying for one of the incoming calls, one of multiple call-related context indications to one of the user endpoint devices. This context indication may inform the user on how the incoming call is to be processed for a change to or from a parked call status.

24 Claims, 8 Drawing Sheets

(56) References Cited

U.S. PATENT DOCUMENTS

| | | | | |
|---|---|---|---|---|
| 2008/0069330 | A1* | 3/2008 | Burckart | H04M 3/428 |
| | | | | 379/210.01 |
| 2009/0061832 | A1* | 3/2009 | Goggans | H04M 19/04 |
| | | | | 455/414.1 |
| 2009/0097633 | A1* | 4/2009 | James, Jr. | H04M 3/428 |
| | | | | 379/215.01 |
| 2010/0091970 | A1* | 4/2010 | Cheung | H04M 3/4285 |
| | | | | 379/207.07 |
| 2010/0183127 | A1* | 7/2010 | Uy | H04M 3/42212 |
| | | | | 379/211.01 |
| 2011/0200036 | A1* | 8/2011 | Furutani | H04L 65/1076 |
| | | | | 370/352 |
| 2012/0148038 | A1* | 6/2012 | Averill | H04M 3/428 |
| | | | | 379/134 |
| 2014/0093058 | A1* | 4/2014 | Larson | H04M 3/428 |
| | | | | 379/201.01 |

* cited by examiner

Call Parking Extension Detail View
When No Call is Parked

Call Parking Extension Detail View
When You Have an Active Call

APPARATUSES AND METHODS INVOLVING PARKING COMMUNICATIONS

BACKGROUND

Aspects of the present disclosure are directed to interactive routing of data communications via data-communications platforms and/or data communications systems such as those providing communications services for various types of calls, from a data server, conveyed in the form of data-communications such as including one or more of audio, video, chat, virtual office indications. As just two of many examples, such a data-communications call in the form of audio may be conveyed from the data server by using VoIP (Voice over Internet Protocol), in the form of alphanumeric characters by conveying a so-called text message using SMS (short messaging service), and/or in another form such as email or MMS (multimedia messaging service). Data communications platforms and systems have allowed individuals to transmit and receive data communications using broadband-network connections in place of traditional telephone lines. An individual's data communications endpoint device can use such a connection to connect to a data communications server that is managed by a data communications service provider. The data communications server can handle communication routing and provide other data communications services for the data communications endpoint device.

One type of data communications server, for example, can be implemented to handle communication routing and provide various other data communications services on behalf of a plurality of remotely-situated client entities such as companies, clubs, etc., over a broadband network, with each remotely-situated client entity having a set of designated endpoint devices. The data communications (aka "incoming calls") to and/or from the endpoint devices are initially (re)directed to the data communications server which is configured to process such incoming calls by routing and/or providing other data communications services on behalf of the remotely-situated client entity with which the endpoint devices are associated.

Computing servers are increasingly being used in these manners to provide various data communications services over a network including, but not limited to, routing of Voice over Internet Protocol (VoIP) communications and/or various other communications services such as messaging, video conferencing, management of data communications exchange servers, packet switching, traffic management, website hosting, remote data storage, remote computing services, and management of virtual computing environments, among other examples. In such data communications systems, call parking and retrieval of parked calls permits a user, involved as a participant on a call, to place the call on hold. When a call is parked, the user and/or service behind the call can generate a code or push a button on a networked (e.g., desktop) phone which may be used for retrieval of the call.

According to one call park feature, a user can park a call in the cloud while using the user's phone to make another call, or inform another employee to pick up the call. Instead of putting the call on hold or forwarding it to voicemail, the user can park the call in its own dedicated space on a call park extension while the caller hears hold music. Call park extension, e.g., as may be offered by a data-communications service provider, is a feature which is similar to placing a call on hold. However, instead of simply placing a call on hold for later pickup on the same line and phone, the user can retrieve the held call from any other phone within the organization.

When the user parks a call, a system typically announces a parking number which must be communicated to the desired recipient who can then enter the number to retrieve the call. When the user sets up a call parking extension via a special key, the user can simply bypass the need to remember and input the call parking number. The user presses the special key to park a call. On the recipient phone, the special key blinks to indicate a parked call. The special key can then be pressed to retrieve the call. As a more particular example, consider a company's need to set up an efficient call flow in a hardware store with departments designated as Lighting, Paints, and Lumber. When the front desk associate answers a call for Lighting, he or she parks the call on an extension reserved for Lighting department. The system may then permit the call to be retrieved by an associate in the Lighting department. If a call park extension is set up using the above-noted special key, the associate can simply press the special key to park and retrieve the call without having to remember the parking number. The front desk associate presses the special key to park the call for lighting department. The associate in the lighting department then presses the blinking special key on the phone to retrieve the call.

In connection with such systems which provide call-parking features, there have been a number of technical problems inhibiting more efficient and/or robust use of call parking. Some of these problems are related to: slow routing (e.g., call routing) speeds with respect to received communications; inability to discern when and/or to effect hand-offs for parked calls; inappropriate management of communications associated with parked calls; poor processing efficiency (e.g., long processing cycles, excessive resources and/or use of communications-channel bandwidth); and customer inconvenience when attempting to use call parking features.

These and other matters have presented challenges to efficiencies of call routing and parking implementations, for a variety of applications.

SUMMARY OF CERTAIN EXAMPLES/ASPECTS

Various aspects and examples according to the present disclosure are directed to issues such as those addressed above and/or others which may become apparent from the following disclosure involving call parking aspects and use features. For example, more-specific aspects of the present disclosure are directed to overcoming such above-noted technical issues by specific improvements in terms of overcoming limits of call parking with regards to automatically forwarding to mobile devices, so that when incoming data-communication calls such as audio calls, emails, messages, etc., are processed for being parked (e.g., convenient for and accessible to users such as on displays of endpoint devices of individuals and/or a CPU-terminal used by a specific departments of a client entity), the users do not need to know/remember specifics on how to retrieve the calls. Further, such specific improvements may concern limitations in connection with telecommunications servicing that may: enable calls to be forwarded to specific mobile devices, by use of a mobile app that provides contextual functionality for users to take further action with respect to a call that is parked; and that may provide for calls to be filtered for processing and/or managing calls to be parked and/or parked calls (e.g., based on geo-locational information and/or availability status of users).

According to one example, the present disclosure may concern a system and/or method (e.g., involving a data-communications server) which uses client-specific sets of data that respectively indicate, for each of a plurality of remotely-situated disparate client entities, data services including data-communications call routing services and parked-call services to be provided on behalf of the client entity from among the client entities. The client-specific sets of data are accessed (e.g., as may be stored in database of a memory circuit), and, in response to receiving incoming calls involving user endpoint devices associated with respective ones of the client entities, certain actions are taken. These actions may involve conveying for one of the incoming calls, one of multiple call-related context indications to one of the user endpoint devices. This context indication may inform the user on how the incoming call is to be processed for a change to or from a parked call status.

In yet further examples (which may also be related to and/or build on the above-characterized aspects and examples), embodiments of the present disclosure may involve data-processing circuitry that is integrated with or communicatively coupled to the data-communications server for performing certain operations/functionality to edify users regarding aspects concerning the incoming call which is the subject of a possible change in terms of being parked or being removed from a parked call status.

In various more-specific examples, the data-processing circuitry may be configured to include an IVR (interactive voice recognition) engine, call-monitoring circuitry for monitoring calls so that sentiments, terms, and the like may be compared with stored information collected from previous calls involving common call participant(s), and/or a call content analysis engine (e.g., an artificial intelligence engine) for analyzing outputs generated by the IVR and/or monitoring circuitry. In a particular system-level example, such data-processing circuitry may be part of a unified call-center and intelligent call-routing system providing data-communications services as a platform-based solution, with such circuitry for carrying out these aspects being integrated by no more than one gateway or no gateways for resolving an issue recognized by monitoring and intelligently routing an incoming call in a selective manner to an appropriate individual or group for realizing the resolution.

This above-characterized processing circuitry may be used to: discern information from the call which indicates that a certain follow-up action is to be taken in connection with retrieval of the call from a parked-call status, and with the data-communications server conveying an indication of the certain follow-up action; monitor the call before causing the call to be parked, and in response to discern information from the call which indicates that the call should not be in a parked-call status at all or in a parked-call status beyond a certain time threshold; discern information from the call that a certain action is to be taken in connection with retrieval of the call from a parked-call status, wherein the certain action is one or more of: forwarding or handing off the call to certain individual or group, and routing the call to a destination address or endpoint device, with the data-communications server conveying an indication of the certain action; discern information from the call that includes or indicates at least one of a topic, an action, and a name derived from data previously-stored by system, with a conveyance of data indicative of the discerned information to provide an insight while the call is parked or being retrieved from parked-call status; discern information from the call including one or more of a filtered status (as above), and a term corresponding to a topic recognized from data previously-stored by system and deemed likely useful to provide an insight about the call, with the server conveying data indicative of the discerned information to provide an insight while the call is parked or being retrieved from parked-call status; discern information from the call that includes or indicates a filtered status corresponding to caller identification data for the call, with the filtered status being as discussed above, the discerned front-end information from the call including at least one of ID data relating to the caller and/or call, and data to identify a topic or subject matter surrounding the call; and the data-communications server using the discerned front-end information to convey data corresponding to an insight for handling the call upon retrieval of the call from a parked-call status.

In connection with further examples (which may also be related to and/or build on the above-characterized aspects and examples), embodiments of the present disclosure may involve one or more of the following: the data-communications server providing data-communications services such as call routing and/or call parking), and/or conveying one of multiple call-related context indications to one of the user endpoint devices for informing on how the incoming call may be processed relative to a change to or from a parked call status based at least in part on one of the different types of calls and different respectively-corresponding communications channels on which the incoming call is received by the data-communications server; the data-communications server conveying one of multiple call-related context indications to one of the user endpoint devices, for informing on how the incoming call may be processed relative to a change to or from a parked call status based at least in part on a user preference of one of the different types of calls and different respectively-corresponding communications channels on which a parked call is to be retrieved; and data processing circuitry prompting the data-communications server to convey that the caller ID is linked to another endpoint device which should be used with retrieval of the call being in a parked-call status.

Further more-detailed aspects and examples may also build on or related to the above-characterizations by way of the server (e.g., having interface circuitry) configured to communicate with graphic user interface ("GUI") circuits of respective user endpoint devices over a broadband network. In these aspects and examples, the present disclosure may involve the server communicating with such GUI circuits (which have a display on which data is provided): for informing on how the incoming call may be processed for a change to or from a parked call status; and/or for receiving user data for selecting options for processing the call upon retrieval from a parked-call status.

One or more of the above example embodiments and aspects may be used in such a system, according to aspects of the present disclosure, to provide data to effect for the user or participant of the parked call an ultra-rich display such as a display to enable visualization of contextual information about a parked call or calls and/or displayable features indicating whether further action should be taken with respect to a parked call and to provide a rich user experience (UX) provided through a GUI (e.g., with options and/or a menu) with enhanced interactive features (e.g., push notification functionality and/or filtering) for management, routing and/or screening of parked calls.

Other examples and aspects of the present disclosure are directed to one of more apparatus (e.g., circuit-based devices and systems) and methods of using such devices concerning: a data-communications system with call parking services, for certain parked calls, one or more context indicators occurring while the call is parked (e.g., based on feedback from the caller and person attending to the parked call), and a data-communications system with resource-specific engines for enhancing context indicators for parked calls (e.g, specific to interactive voice recognition processes to engage the caller, a call content analyzer with access to other resources for enhancing an initial context indication of a parked call, and an Internet searching engine for retrieving further information regarding the call (e.g., based at least in part on an initial context indicator).

The above discussion/summary is not intended to describe each embodiment or every implementation of the present disclosure. The figures and detailed description that follow also exemplify various embodiments.

BRIEF DESCRIPTION OF THE FIGURES

Various example embodiments may be more completely understood in consideration of the following detailed system-related description in connection with the accompanying drawings, in which.

Figure 1A:
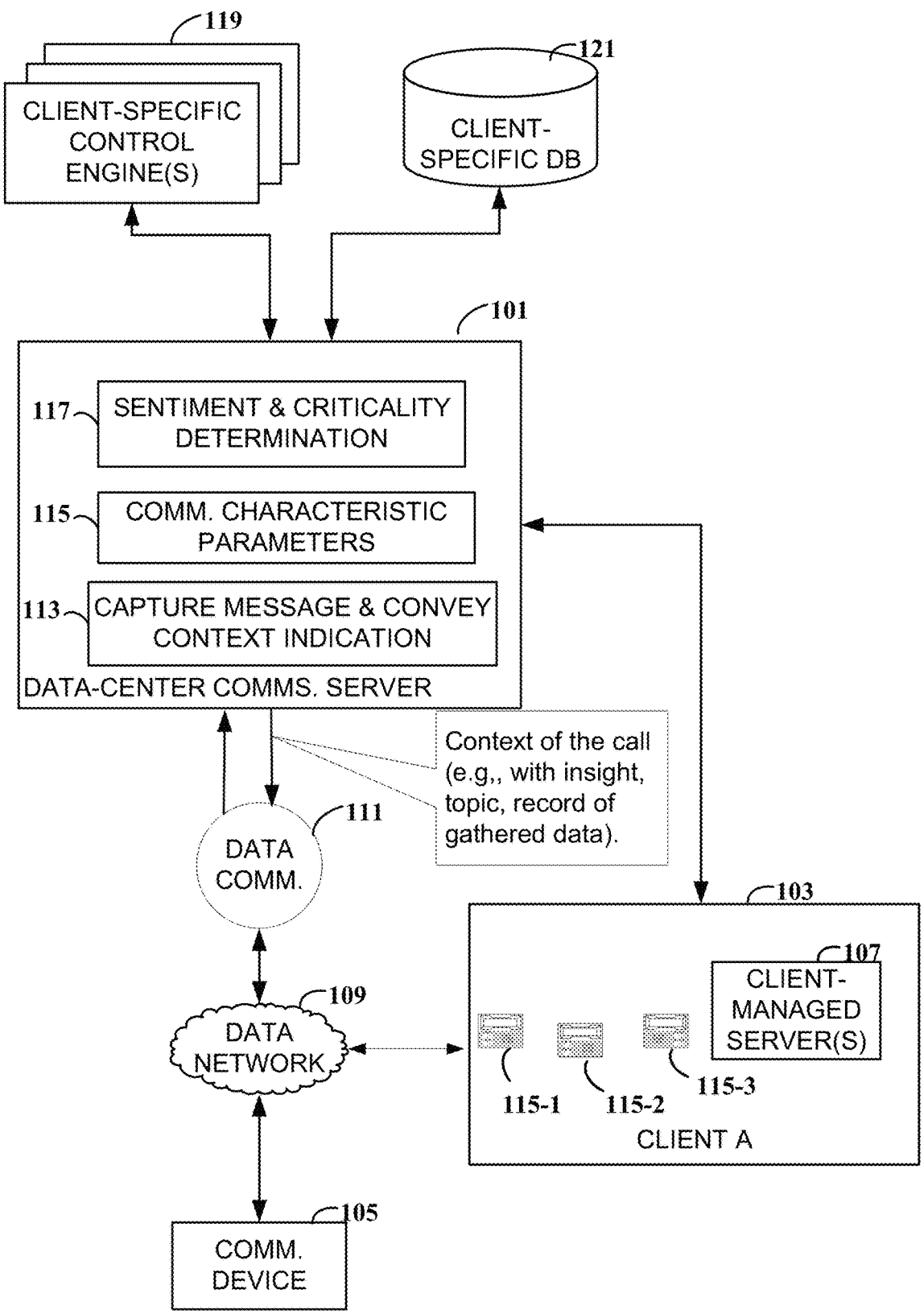
FIG. 1A is a block diagram of an example system enable to process call-parking features according to the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described.

FURTHER DESCRIPTION

Aspects of the present disclosure are believed to be applicable to a variety of different types of apparatuses, systems and methods involving an Internet-enabled user endpoint device phone (e.g., smartphone) and/or a mobile app used on such an endpoint device, from which a server-routed call may be parked or retrieved from being parked. Such aspects are believed to be particularly beneficial in the context of a mobile workforce where a group of individuals, such as a company's employees, have downloaded an app for implementation on their respective endpoint devices (e.g., 8×8 Work™ app available to client entities registered to receive data-communication services from 8×8, Inc. of Campbell, California). While the following discussion refers to call parking for certain apparatuses, such discussion is provided as an exemplary context to help clarify such aspects, and the present disclosure is not necessarily so limited.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In specific examples according to the present disclosure, certain embodiments are directed to data-communications services in connection with a data-communications system which may involve the system itself, various system components, and methods of using the system and circuit-based components. As more-specific examples, such an apparatus (e.g., system and/or component used by the system) may include or refer to a data communications system including a server and its operations, a smartphone (e.g., mobile phone) or another type of CPU-based user equipment which may have a display as part of a graphic user interface or another form of conveying featured information (e.g., in connection with a parked call being handled or processed by the system) for review by a user of the system-provided communication services.

One such specific apparatus or method in this regard is directed to a data communications system including a server through which calls are routed and further including data-processing (CPU-based) circuitry communicatively-integrated with the server, so that calls through the data communications system (e.g., involving a call-participant or user who receives the system's data communications services through a system-registered device) may park such a call through the system-registered device and when the user has a mobile device (e.g., a handheld smartphone), the parked call may be retrieved through the user's mobile device. In a more specific example, the present disclosure is directed to a method of using such an apparatus (e.g., a system, device, etc.) which may involve call parking in connection with mobile smart-devices (or smartphones) as respective endpoint devices. With the smartphone(s) running an app which may be downloaded to the mobile device, such a parked call and related data can be retrieved through a user's smartphone. For example, one such method in this scenario may include: storing client-specific sets of data which respectively indicate, for each of a plurality of remotely-situated disparate users of client entities (or more generally "client entities"), data-communications services including data-communications call routing services and parked-call services to be provided on behalf of the client entity from among the client entities; accessing the client-specific sets of data and, in response, receiving incoming calls involving user smartphones associated with respective ones of the client entities and providing the data communications services to the client entities in a manner consistent with the client-specific sets of data; and for an incoming call from among the incoming calls, conveying one of multiple call-related context indications to one of the user smartphones, for informing on how the incoming call may be processed for a change to or from a parked call status.

In connection with examples of this type, call parking may involve forwarding an incoming call (e.g., as initially received by the data-communications server) to a users' work app while the app is running on a mobile device, and/or may involve forwarding such an incoming call to a specific department device for processing the call (e.g., and also to the users' personal mobile device). In a specific system of this type (and as exemplified in and consistent with certain of the examples in the figures as discussed below), and involving the data communications server (e.g., being cloud-based and including a plurality of CPU-based data server circuits having shared functionality), the circuitry may be part of a unified call-center and intelligent call-routing system, with such circuitry for carrying out these aspects being integrated by no more than one gateway or no gateways for resolving an issue recognized by monitoring and intelligently routing an incoming call in a selective manner to an appropriate individual or group for realizing the resolution.

In another example, aspects of the present disclosure concern a system and/or method which uses client-specific sets of data that respectively indicate, for each of a plurality of remotely-situated disparate client entities, data services including data-communications call routing services and parked-call services to be provided on behalf of the client entity from among the client entities. The client-specific sets of data are accessed (e.g., as may be stored in database of a memory circuit), and, in response, the server receives incoming calls involving user endpoint devices associated with respective ones of the client entities. These actions may be followed by the server providing the data services for the incoming calls in a manner consistent with the client-specific sets of data, and conveying for one of the incoming calls, one of multiple call-related context indications to one of the user endpoint devices. This context indication may inform the user on how the incoming call is to be processed for a change to or from a parked call status.

In more specific examples, feedback may be provided in response to the call-related context indication(s) for soliciting more information, confirmation or confidence concerning the call-related context indication(s) being accurately aligned with a parked call. In yet further examples, this feedback solicitation may involve use of different specialized processing modules which are coupled to or integrated with the data-communications server and used to enhance the context indication(s) and provide the user who may retrieve the call with more information relevant to the purpose of the incoming (and now parked) call. Examples of such specialized processing modules include (without limitation): an IVR (interactive voice recognition) engine which can be directed to engage the caller while the call is parked; an AI/ML (artificial-intelligence/machine learning) engine with access to records internal and/or external to the system for expanding on the context indication(s) or more-specific requests associated with the feedback solicitation; and one or more combinations of these tools. An example of records or external to the system for expanding on the context indication(s) might include third-party resources (e.g., as may be purchased from data analytics providers), and Internet-based search results conducted by the data-communications server or an effort by an independent company.

Examples of records internal to the system for expanding on the context indication(s) might include records maintained in a database of a memory circuit including records of previous products sold by the client entity which might be linked to customer calls having problems with the products. Such records may be developed and correlated by a call-analyzer engine, integrated with the data-communications server which is configured to monitor on behalf of the client entity, calls to certain endpoint-device IDs (e.g., phone numbers, emails, chat channels, etc.). The data-communications server may maintain a client-specific profile which is configurable by the client entity for providing lists of such products with directives that the server record and correlate caller information (e.g., called IDs, email addresses, etc.) in the database on a product-by-product basis.

Consider the hypothetical example in which a hardware retail store is the client entity receiving, from a data-communications server, data-communications services which include call parking services as characterized above. A customer of the hardware retail store may call the store with a question about a defective dehumidifier purchased at the store. The system initially processes the incoming call from the caller through a call-center (operated on behalf of the store) which uses an IVR to gather information concerning the nature of the call. Through the IVR, the server learns that the call concerns a defective dehumidifier and, in connection with parking the call until personnel in the appliance department are available, the server sends context indication (e.g., "defective product") to an endpoint device linked to the appliance department. Upon a user (personnel) in the appliance department being available for retrieving the parked call, the user is curious to know which product is at issue and whether the caller is questioning: the store's return policy for a certain type of product such as this one, a possible warranty claim; a recall for the product at issue; a rebate; or something else. Hence, before retrieving the call, the user taps a "feedback menu" icon adjacent the portion of the endpoint device's GUI screen showing "context indication". This icon prompts the user to select a particular dropdown item ("more data via IVR") and in response, the IVR engine intervenes by retrieving the call and asking the caller which if any one of these different categories might be at issue. Other selectable dropdown items from the same feedback menu, upon one being selected by the user, permit the user to solicit information pertaining to either: external data as might be obtained from an Internet search (e.g., as indicated by the context indication which in this case is "defective humidifiers") to be conducted by the server using a separate Internet search channel; or both information from the IVR process (as above) and also such external data. In this example, the external data gathered from such an Internet search may pull up a list of dehumidifier manufacturers and their model numbers which have been previously identified as being defective. In response to gathering such further information, the user retrieves the parked call with specificity and likely particular answers to the callers specific questions.

In such a data communications system, a server arrangement is implemented that may be dedicated to one entity, or centralized (e.g., cloud-based server or otherwise) and which serves multiple entities. Further, the system may provide the data communication services to user's devices directly and/or indirectly such as through respective IPBXs (Internet Protocol private branch exchange, or "PBX") with each such PBX being managed on behalf of an entity (e.g., employer and/or employer department associated with the user of the device) and/or one or more of the PBXs having a server that is dedicated to users affiliated with the respective entity. Alternatively, the system including the data-communications server may be implemented by way of provided control for the remotely-situated client entities over the cloud (e.g., broadband network such as the Internet, satellite communications and/or a cellular telephone network) without physical PBXs being used on behalf of some or all of the client entities. Depending on the particular configurations associated with the particular system, the system server and/or each such the PBX server may be integrated with processing circuitry of various forms to interact with authorized ones of administration personnel working on behalf of the remotely-situated entities (or users), whereby the entities and respective user endpoint devices receive one or more of these call parking features as part of a set of one or more data-communications services to be provided by the system.

In certain of these examples, such incoming data-communications calls may be received and/or routed (e.g., by a data-communications server of the services provider and/or a server operated independently such as on behalf of a client entity) by using any one or multiple types of calls and conveyed via different respectively-corresponding communications channels. Examples of the different types of calls and different respectively-corresponding communications channels include: a VoIP (Voice over Internet Protocol) channel for audio calls, a chat message channel for sending chat messages, an SMS channel for text messaging, an email channel for communicating emails, a MMS channel for multimedia messaging; and one or more channel for conducting a multi-party meeting involving communications of audio and/or multi-media by at least three endpoint devices respectively located at least three different locations. Often such data communications are provided as specific services (e.g., individually or as part of a package) and may also include data communications to effect a virtual office environment through which users work in locations remote from the apparent location being called.

In accordance with the above and other aspects of the present disclosure, exemplary embodiments provide technical advantages over another type of system such as one discussed below in connection with FIG. 1A, but which system does not have such call-parking features as described herein. As specific examples, certain exemplary processes and systems described herein include, but are not limited to, one or more of the following: enabling faster routing (e.g., call routing) with respect to received communications; improving operating speed in communication routing; providing contextual hand-offs for parked communications (e.g., parked calls) such as through use of mobile app; applying filtering (e.g., geo-locational and/or status-based) to better manage parking of communications and response times; improving processing efficiency (e.g., reduction in processing cycles, saving resources/bandwidth) for computing devices when managing routing of communications through an applications/service; reduction in latency through efficient processing operations that enable automatic parking of communications and receipt of parked communications; provision of GUI interaction adapted to enable better management of parked communications with provision of relevant context data at the GUI for preparation of various tasks such as: forwarding, handing off or terminating the parked call, responding to issues raised in such calls, and executing follow-up actions. As will become apparent, GUI aspects and related functionality according to the present disclosure provide for improved usability of applications/services, including control and efficiencies in connection with management and processing of parked communications and improving customer experience for users of applications/services involving parked communications. Among other technical advantages, such processes and apparatuses may be configured to technically advantage communications and efficiencies in terms of providing: better user/customer experience; better efficiency for resolving issues; and CPU-based user-operated equipment or "endpoint devices" with downloaded apps provided by communications-service providers (e.g., 8×8, Inc.) which are run by the endpoint devices so as to make their tasks (e.g., communications and operations) more efficient such as in terms of reducing latency, reducing processing cycles, and making them more of a specific-purpose computer (e.g., as opposed to performing routine general purpose computing operations).

According to a first more-specific aspect, the present disclosure concerns call parking mobility through connection with mobile apps, and in view of the prevalence of users having mobile devices (e.g., smartphone). In connection with such call parking mobility aspects as part of a call-parking services package for a client entity, the system's server circuitry is configured to forward a call to the user's smartphone with the smartphone having an app (e.g., similar to 8×8's Work app) running on a smartphone. In an alternative scenario, the server circuitry may forward a call to an endpoint device (call-center CPU terminal) associated with a specific department of a user being targeted by the call, or to such a departmental endpoint device in addition the user's personal mobile device. Push notification functionality may be used to streamline processing for callers/recipients, and may also provide contextually-relevant UX experiences (e.g., for departments). As an example, consider a call from X to Y: notification is presented on user's mobile device pertaining to a parked call; and the user can tap notification, which brings up context of a specific parked call or a listing of all parked calls with contextual information for each call. Also, the rich UX may vary based on the intended recipient (e.g., the department) that is receiving a parked call. Some mobile app-specific UX for taking actions with respect to call (e.g., in specific department—sales) might have different UX features from the contact center (which may or may not be cloud-based).

Also according to the present disclosure, other specific features relating to management and processing of parked calls are directed to advantaging users who have mobile devices such as smartphones as their endpoint devices. Such users, by way of these features, are provided a data-communication UX system communicating with the users through a rich, interactive user interface ("UI" or more-specifically GUI) implemented on their mobile devices. As one example of such features, the users' mobile devices employ push notification functionality to streamline process for callers/recipients through a UX menu. Additionally, this approach may be extended to provision of contextually-relevant UX experiences (e.g., for departments of one or more of the client entities). For example, UX suggestions for a sales department may differ from those in the help desk (contact center) department. As a specific example, consider a call from user X to user Y which may occur through the data-communications server using the above-type of cloud-based system architecture (e.g., with or without one or more PBXs).

According to exemplary aspects of this feature, notification is presented on the user's mobile device pertaining to all or selected types of parked calls, depending on whether the user has: enabled a default setting (e.g., through the client-specific data stored in a database and accessed by the system), taps "notification" on the GUI to enable context to be provided for all parked calls, and also on the GUI, taps "notification" adjacent or corresponding to each parked call in a list of parked calls. In this manner, in response to the notification being activated the server and mobile device bring up on the display a context of each such parked call with the context corresponding to contextual information deemed likely relevant to the call as determined by call monitoring and/or call analyses processes of the data-communications system. While the rich UX may vary based on the intended recipient (e.g., a department versus an individual user) that is receiving a parked call, depending on the type of call that is parked, specific context and types of actions may be taken with respect to each type of intended (e.g., a specific department-sales in a company might have different UX features from a contact center used by the company).

Another specific aspect of the present disclosure concerns filtering of such calls for parking related purposes and for routing of parked calls. Filtering can be geo-locational and/or status based (e.g., user status through an app similar to the 8×8 Work app). Further, the UX notifications can be provided relative to this filtering, and such notifications may include, for example, additional information (e.g., insights) that is automatically displayed so as to indicate why filtering was automatically applied. Geo-location filtering may relate to call parking in that this aspect involves notifications sent to users who are on-site at a location and have the relevant app installed and running as opposed to such users who may be at home. This aspect can also be status based in that status notifications can be sent to indicate situational aspects involving availability, preferences and/or relative locations situations (e.g., being away such as not "on-site at location", OOO (out of office), do not disturb, and available). While many examples discussed herein exemplify by way of a display and/or a GUI in connection with a user's endpoint device receiving such notifications, in certain more specific implementations, exemplary aspects of the present disclosure are directed to using different types of notification/communication tools. For example, a user may be notified (e.g., at a user interface (UI) via an endpoint device of such call-related contexts and call-parking features using UI tools which do not correspond to a conventional GUI for a display screen. Various exemplary tools and forms of such user communications include (without limitation) types of user interfaces having coded communication mechanism such as speakers (e.g., to effect a special sound such as a specific ring, alarm or buzz), and mechanical tools such as vibrating piezo-electric devices which may be heard and understood through different sound/vibration codes. Also, in instances where a GUI and/or display may not be available or useful (e.g., as may be applicable to vision-impaired users), a UI might convey such call-related contexts to the user by way of device lighting condition (e.g., flashing or dimming light or portion of display screen) or vibration of the device (e.g., part or all of the device) which may vibrate one's hand or another perceived equipment or limb (e.g., lap or ear-bone vibration) to alert the user of a unique context in connection with a parked call and optionally to seek help from another in retrieving notifications regarding call-related and/or call-parking situations.

There are many examples of such contexts and/or possible follow-up actions applicable to many of the examples of the present disclosure. In connection with certain more specific aspects and example embodiments, one or more of the multiple call-related context indications may be discerned and/or conveyed to a GUI of an endpoint device for handling, retrieving and/or placing a parked call. In certain examples, the contexts and/or actions may be indicated in a database or by the server (e.g., using the call analyzer or IVR). Such contexts and/or actions may include any of various possible contexts associated with the client entity or the endpoint device of the user who is targeted by the call (aka "callee"). These contexts and follow-up actions may be registered in the memory circuit for the client entity and correlated to caller ID data, topics linked to the calls, etc. The contexts and/or actions may also be indicated by a specific or filtered status concerning the callee's availability status, a geographical-location status of the caller or callee, a filtered aspects associated with data involving the call (e.g., caller ID information, and a certain level of importance or priority associated with the caller or discerned topic of the call). In other examples, the contexts and/or actions may be indicated by one of various topics of which calls linked to the current call has been associated. For example, this may be determined by using a predetermined configuration of optional topics such as names of product offerings linked to the client entity or by using artificial intelligence or machine learning by a call analyzer of the server.

According to yet another more-specific aspect, the present disclosure concerns an ultra-rich display, for example, which can display contextual information about parked call(s). As examples, the ultra-rich display can provide information concerning one or more of the following: how long the call has been parked; who is the original caller involved in the parked call; who parked the parked call; and what is the destination of the parked call. Additional UX features of the ultra-rich display may involve taking further action with respect to a parked call (e.g., a point of sales (POS) transaction, help desk ticket management, messaging, video chat, etc.).

Turning now to the figures, FIG. 1A illustrates a block diagram of an example system to show how the system, according to the present disclosure, may receive an incoming call for a targeted user endpoint device of a client entity which may have a client-specific set of data stored in a database of a memory circuit, and with the system parking the call (with or without the call first being routed to a specific endpoint device) for later retrieval by an endpoint device based on a context or insight sent from a server of the system to one of possibly many endpoint devices designated by the client entity (e.g., as may be indicated in client-specific information stored in the database).

For example, a data communications device 105, such as may be used by a customer of a client entity, may send a user-data communication to a client. For instance, customer Jeff Smith may call ABC Company with a question about a product that he purchased. The phone call placed by Jeff Smith (e.g., the user-data communication) may originate from Jeff Smith's device 105. Communications device 105 includes circuitry configured and arranged to facilitate data communications with client A, as well as a data-center communications server 101. The user-data communication (e.g., Jeff Smith's phone call) may be communicated to the client (e.g., client A 103), via a data network 109. The data network may be communicatively coupled to a data-center communications server 101, such as may be provided by a data communications server providing data communications services on a subscription basis.

The user-data communication may be routed to the client entity, directly parked by the server 101, or first routed to an endpoint device and then parked with information conveyed to one or more of the endpoint devices (e.g., 105, 115-1, 115-2, etc.) to provide the endpoint device(s) one of multiple call-related context indications for informing on how the incoming call may be processed for a change to or from a parked call status. Also, the incoming communication call may be processed by the data-center communications server 101 to analyze the sentiment and criticality of the call, and handle the call in accordance with rules specified by the client, particularly if the call ends up being parked. For example, if Jeff Smith's communication to ABC Company is a voice-type call, and if this call is initially unanswered, then his call may be routed to a message recording system such as a voicemail system or it may be parked until the call is hopefully retrieved for aiding the caller with more information or resolving an issue raised by the call (e.g., as may be provided by the server using an IVR process or artificial intelligence and/or a live person). During the call, the server may process the call by monitoring terms of the call and/or recording the call (e.g., with transcription). The call may also be analyzed by the data-center communications server 101 with respect to previously-gathered information regarding, for example, recognition of a term in the current call overlapping with a term of at least one previous call from the same caller as indicated by caller ID information common to the current call and the previous call(s). For instance, the communication sent from Jeff Smith may first be sent to the client entity (e.g., Client A). If the communication is not answered by Client A, then the communication may be sent to a message recording system. In some embodiments, the message recording system may be managed and/or hosted by the client entity. Additionally and/or alternatively, the message recording system may be managed and/or hosted by the data-center communications server (e.g., by a communications service provider).

Once the customer begins recording, typing, communication, and/or generating the data communication 111, the data-center communications server may analyze and park the call, or analyze and route the call and permit the call to be parked (e.g., in the cloud of servers corresponding to the server 101 (which may effect its operations through a client-specific control engine/server 119 specific to and on behalf of the client entity targeted by the call) and the parking may be caused automatically or by a particular user endpoint device such as the client entity or user for which the call was targeted. Once parked, the server (e.g., server 101 directly or indirectly through server 119) sends an indication of the discerned context of the one of more user endpoint devices, typically an endpoint device of the targeted client entity or user. Using the analysis tools within the server 101 of FIG. 1A, this context indication may be a topic of the parked call or a certain sentiment and/or criticality discerned from the call (e.g., tone of audio in a call or upper case letters in an email-type call), and this context indication may be used by the endpoint device for retrieving the parked call from a parked call status. Also, before the call is parked, this context indication may be sent from the server to the targeted the endpoint device and used by the targeted endpoint device to decide whether to park the call or a process the call in a different manner (e.g., answer the call, send it to an IVR process/engine, forward the call, etc.).

As a specific example using the exemplary arrangement of the system of FIG. 1A, at block 113, the data-center communications server 101 may capture the incoming call sent by the communication device 105. This call may pass from the endpoint device through the data network 109 and one or more data communication channels at 111. Such a call may also be initiated by one of the endpoint devices 115-1, 115-2, etc. of client-entity A, and the target of the call may be any one of the endpoint devices 115-1, 115-2, etc. or another third party endpoint device, such as 105, that may or may not be associated with the system of FIG. 1A or a subscriber to the data communications services provided to the system of FIG. 1A. Filtering for calls to be filtered, for processing and/or managing calls to be parked and/or parked calls (e.g., based on geo-locational information and/or availability status of users) may also be performed by block 115.

Continuing with the example above, Jeff Smith may convey an audio message and/or an email message for Client A. While Jeff Smith is conveying the message, a record of the message (e.g., a transcript of his audio) may be generated. At block 115 and/or block 117, the server 101 may analyze terms and parameters used in the message (block 115) to determine a topic or issue associated with the call and/or determine sentiment and any criticality (or degree of importance) being linked to the call. For example, the server may discern in this matter that the caller is very pleased (or upset) with a manner in which an issue was handled and this call indicates that the caller is a VIP (very important person) or VNP (very needy person) for which the call needs special attention such as being handled by a supervisor. The data-center communications server 101, at block 113, may then convey one or more of these various call-related context indications to the user endpoint device(s) to inform a user on how the incoming call may be processed for a change to a parked call status or from a parked call status. This context indication, and optionally additional information such as a network link to previous calls involving the discerned topic or the caller, may be sent to the endpoint device on a designated type of communication channel as illustrated in FIG. 1A through one or more data communication channels at 111 and the data network 109. Further, in more specific examples, an endpoint device processing the call may provide feedback (e.g., or a request) to the server through the data network 109 and one or more data communication channels at 111.

While the examples provided herein discuss a data communication including a voice call and a generated voicemail, it is noted that examples are not so limited. The data communication and resulting message may include non-voice messages as well. Accordingly, the message associated with the user-data communications may correspond to a user-generated audible message or a non-voice user-generated message. As an illustration, the non-voice user-generated message may include an email or a text message. Examples are not so limited, however, and additional and/or different types of voice and/or non-voice user-generated messages may be generated.

During recording of a message associated with the user-data communications and on the message recording system, speech characteristic parameters of the message may be analyzed. For example, while Jeff Smith is recording his voicemail, he may mention a particular project such as "I am calling regarding project purple, and have some questions that I would like to discuss." Project purple may be flagged as an important project by client A, such that the mention of project purple results in specific handling of the voicemail. Additionally and/or alternatively, Jeff Smith may make disparaging remarks that indicate he is unhappy. For instance, he may say "I am exceptionally disappointed with the level of service which I have received, particularly from service representative Jane Doe. She has failed to communicate with me, she has missed key deadlines, and I demand that I am compensated for lost time!" Because of the keywords "disappointed," "failed," "I demand" identified in the message, Jeff Smith's message may be flagged for special handling to mitigate his level of dissatisfaction.

Regardless of the format of Jeff Smith's communication to client A (e.g., whether it is a voice call, a text message, and an email message, etc.), the data-center communications server may analyze the contents of the message. For instance, in the example that Jeff Smith's communication is a voice call, the data network 109 may direct a voice communication (e.g., data communication 111) to a message recording system, such as may be hosted by the data-center communications server 101. In such example embodiments, the voice communication is directed to a particular client (e.g., client A 103) among a plurality of remotely-situated client entities. Each of the plurality of remotely-situated client entities is configured and arranged to interface with a data communications server providing data communications services on a subscription basis, and each of the plurality of remotely-situated client entities associated with a respective client-managed server 107. As illustrated in FIG. 1A, each of the remotely-situated client entities may be associated with a plurality of end-user communications devices, which include circuitry configured and arranged to facilitate transmission of the data communications services provided by the data communications server 101.

As described herein, the data-center communications server 101 and/or the client managed server 107 may facilitate the routing of voice communications associated with a particular client entity (in the example of FIG. 1A, client A 103). For instance, during recording of a message associated with the voice communication and on the message recording system, speech characteristic parameters of the message may be analyzed. In some embodiments, the client managed server 107 may analyze the speech characteristic parameters at 115. In other embodiments, the data-center communications server 101 may analyze the speech characteristic parameters. In yet further embodiments, both the client managed server 107 and the data-center communications server 101 may analyze the speech characteristic parameters for a redundant system. As used herein, the speech characteristic parameters refer to or include factors that assist in identifying a sentiment, topic, and/or issue of a particular communication. Speech characteristic parameters may include key words, phrases, a combination of key words and phrases, and/or measurable audio values including a wavelength or velocity of the recorded message, and an amplitude of the recorded message.

The data-center communications server 101 may determine a sentiment score and a criticality score for the message based on the analyzed speech characteristic parameters, at 117. The sentiment score, as used herein, refers to or includes a numerical value associated with an overall sentiment of the recorded message. A criticality score refers to or includes a numerical value associated with an overall importance of the recorded message. The sentiment score and the criticality score for a particular message may differ between respective client entities. For instance, a particular sentiment for one client entity may be negative and indicative of a client service issue, whereas the same sentiment for another client entity may be positive and not indicative of a client service issue. Similarly, particular topics, key words, phrases, or combinations thereof may be associated with a highly critical (e.g., important) project for one client entity, and not important for another client entity. Accordingly, the data-center communications server 101 may be communicatively coupled to a client-specific database 121, and/or a plurality of client specific databases. The client specific database 121 may store correlations for each respective client entity served by the data communications provider, associating key words, phrases, combinations of key words and phrases, and measurable audio values with different respective sentiment scores. Similarly, the client specific database 121 may store correlations for each respective client entity served by the data communications provider, associating key words, phrases, and combinations of key words and phrases, with different respective criticality scores, and these aspects or parameters of the calls may be aggregated and correlated over time according to categories such as: identification (ID) of the callee/caller, specific topic, sentiment type, etc. Such aggregation may be involve call processing circuitry to operate on calls (e.g., while or after they are monitored by the server), by using aspects of the above-types of data communications systems and/or off-site equipment as may be available from third parties. Such equipment and call processing circuitry may be utilized for a variety of such parameters and include, as examples, speech and speech-characteristic analysis for transcription and sentiment-related analysis of VoIP-type data communications, aggregation of user-data communications corresponding to a user-generated messages (e.g., post transcription as calls are monitored for such aggregation and handling according to permissible client specific rules), machine learning-based algorithms to route data communications in a data communications network, etc. Depending on how the client entities may specify specific uses of call-parking services provided by the data-communications system, such aggregated data may be used in various ways such as on a display on a user's endpoint device. Some examples in this regard include: notifying the user regarding a general status of the caller of the parked call (e.g., "high-priority client", caller is an employee from "ABC Company" or the caller's title); and/or notifying the user regarding a specific topic for which the parked call relates ("concerning a product defect"). As further examples: the server may be configured via the client-specific database for notifying the user regarding a specific topic, the caller's sentiment and an action for which the parked call relates and when such action is to be completed, thereby preparing the callee who is to retrieve the call to best gather data to respond substantively to the caller's inquiries, and in a more involved example scenario, further notifying the user with suggested resources (or network links) to identify from where previously-gathered information likely relating to the parked call may be retrieved. In these and other specific examples, the data-communications server, the associated endpoint device and its display (or GUI) may be implemented such that communications between the server and the endpoint devices are to inform the user on how the incoming call may be processed for a change to or from a parked call status, and by providing the user data with GUI-selectable options for processing the call upon retrieval from a parked-call status.

In certain more-particular examples, client entities may specify a threshold range for sentiment scores and a threshold range for criticality scores which trigger respective actions by the data-center communications server. Accordingly, the client specific database 121 may maintain a set of rules associating sentiment scores and criticality scores with various communication handling processes. For instance, one client entity may specify that messages with a sentiment score above a particular threshold, and/or messages with a criticality score above a particular threshold should be routed to an agent within the organization, rather than directing the caller to leave a message. As another illustration, a client entity may specify that messages with a sentiment score above a particular threshold, and/or messages with a criticality score above a particular threshold should trigger the generation of a message (in the form of a text message and/or email) to the recipient, indicating the presence of the message. The manner in which each respective communication is handled may be specified in a client specific database 121. The database may also include customer relationship management data, and context information associated with particular clients among the plurality of remotely-situated client entities.

The data-center communications server 101 and/or the client-managed server 107, may identify a plurality of speech characteristic parameters by analyzing at least one of words and tones of voice communications previously received by the plurality of remotely-situated client entities, and correlating the plurality of speech characteristic parameters with a particular sentiment. The data-center communications server 101 and/or the client-managed server 107 may determine a sentiment by comparing the sentiment of the received message with attributes stored in the client specific database. Similarly, the data-center communications server 101 and/or the client-managed server 107 may determine a criticality by comparing the issue or topic of the received message with attributes stored in the client specific database. In various example embodiments, the data-center communications server 101 and/or the client-managed server 107 may identify a plurality of speech characteristic parameters by analyzing at least one of words and tones of voice communications previously received by the plurality of remotely-situated client entities, and correlating the plurality of speech characteristic parameters with a particular sentiment. In this regard, the data-center communications server and/or the client managed server 107 may identify thresholds delineating ranges for a plurality of sentiment scores, each respective sentiment score including a numerical value associated with an overall sentiment of the recorded message, determined by at least one of a frequency of audio of the recorded message, a wavelength or velocity of the recorded message, and an amplitude of the recorded message. The thresholds delineating the sentiment scores may be dynamic, in that they change over time and are modifiable by the client entity. Machine learning and/or artificial intelligence may implement such threshold determination, such that with added use, the thresholds for sentiment and criticality become more defined with a larger data set.

The data-center communications server 101 and/or the client-managed server 107 may identify a plurality of speech characteristic parameters by analyzing at least one of words and tones of voice communications previously received by the plurality of remotely-situated client entities, and correlating the plurality of speech characteristic parameters with a particular criticality indicative of an overall importance of the recorded message. As such, thresholds delineating ranges for a plurality of criticality scores may be identified, each respective criticality score including a numerical value associated with an overall importance of the recorded message, determined at least in part by key words included in the recorded message.

The data-center communications server 101 may retrieve a set of client-specific communication handling rules associating sentiment scores and criticality scores with communication handling processes. For instance, the client specific database 121 may store rules for each of the different clients served by the data communications provider, directing how communications meeting specific criteria are handled. Additionally, client-specific control engines 119 may specify a manner in which endpoint devices such as communication devices 105, 115-1, 115-2, and 115-3 are controlled, and/or a manner of routing of a data communications for a client account. In various example embodiments, handling of the message based on the sentiment and criticality scores includes during the recording of the message, and routing the voice communication according to the client-specific communication handling rules. For instance, the recording of the message may be interrupted and the voice communication may be routed to a human operator based on the determined sentiment score or the determined criticality score.

Figure 1B:
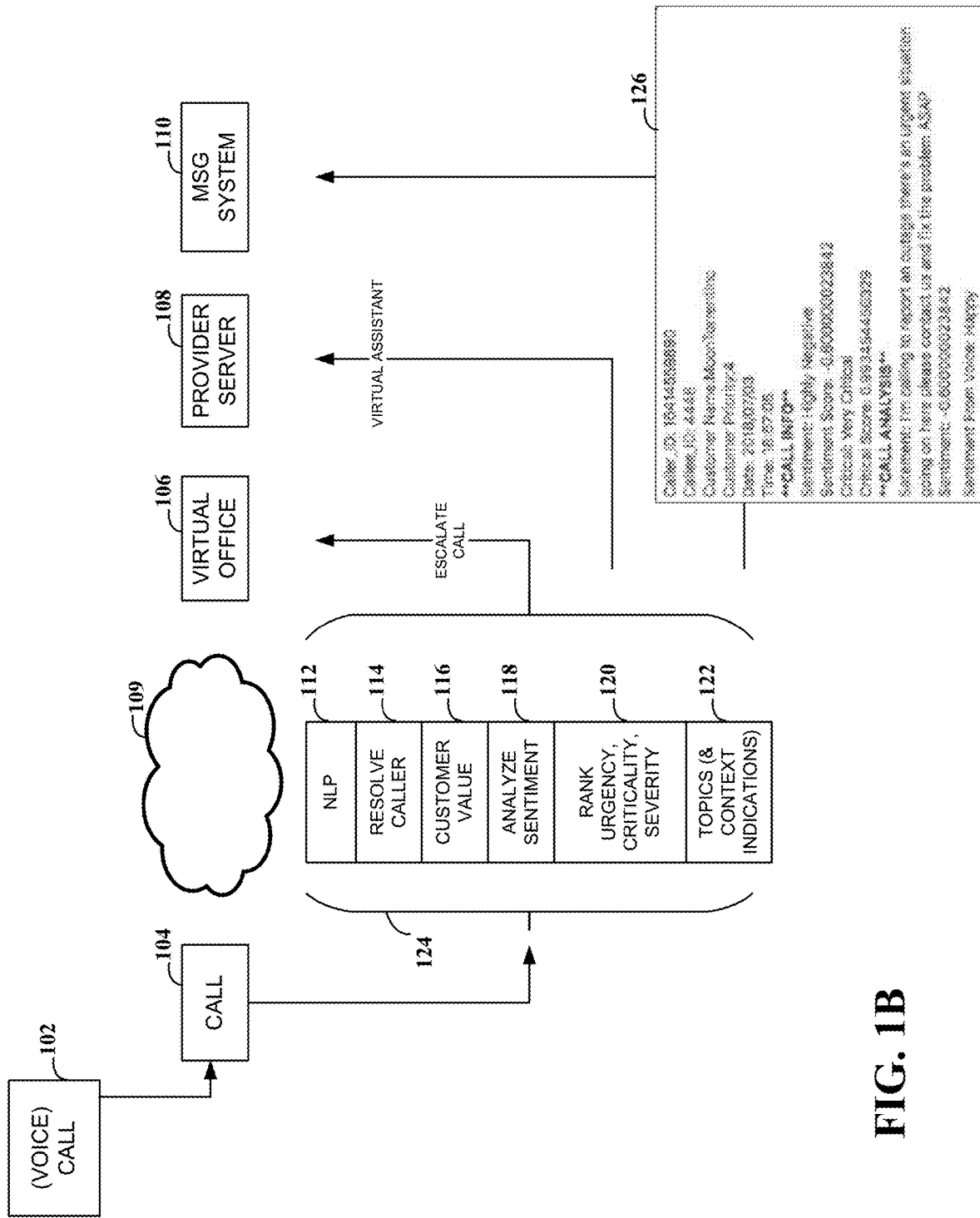
FIG. 1B is a flow diagram illustrating an example method for involving user-data communications for implementing call-parking features in a system such as illustrated in FIG. 1A, consistent with embodiments of the present disclosure.

FIG. 1B is a flow diagram illustrating an example method for monitoring user-data communications, consistent with embodiments of the present disclosure. Particularly, FIG. 1B illustrates an example embodiment including monitoring of an incoming call such as a voice call. As illustrated, the incoming call 102 may be placed by a data communications device (e.g., communications device 105 illustrated in FIG. 1A, and received by the data network (e.g., 109 illustrated in FIG. 1A). The user-data communication (e.g., voice call 102 in this example embodiment) may be routed to the client entity, and in the event that the communication is not promptly answered, the incoming call may be parked for later retrieval or other processing by an endpoint device or may be directed to a messaging system. In either case, a call content analyzer, an IVR or other engine (not shown in FIG. 1B) may be used to identify topics and related context indications within the server (e.g., at 122 of FIG. 1B). During the processing and/or recording of the incoming call, the data network 109 may analyze the message using at least one of a plurality of content analysis processes 124, as described herein. For instance, the network 109 may implement natural language processing (NLP) 112 to identify key words in the incoming call 104. Additionally, the network 109 may resolve the caller (e.g., identify an individual and/or organization that placed the call) 114, using such methods including caller identification and/or reverse lookup. Based on the identity of the caller, different handling processes may be implemented. For example, calls from one client may be sent to voicemail, whereas calls from a different client may be routed to a live agent upon receipt instead of to a voicemail system. Additionally, the network 109 may identify a customer value 116 and route the call/user-data communication based on the overall value of the customer. For instance, one client may be highly valuable to the client entity because they purchase a large volume of goods and/or services from the client entity. Accordingly, calls and/or user-data communications from the high value client may be handled differently than calls and/or user-data communications from a lower value client. As an illustration, calls and/or user-data communications from the high value client may be sent to a particular representative and/or department of the client entity rather than a voicemail system, whereas calls and/or user-data communications from the lower value client may be sent to the voicemail system if a representative is not available.

Additionally and/or alternatively, the network 109 may analyze the sentiment 118 of the incoming call 104. As described herein, the sentiment may reflect an overall emotion and/or human reaction represented in the recorded message, such as may be determined by a frequency of audio of the recorded message, a wavelength or velocity of the recorded message, and an amplitude of the recorded message. For instance, a caller that is screaming on the incoming call would have a different sentiment as measured by the volume of the message, as opposed to a caller that is speaking in a low and calm volume. As another illustration, a caller that is panicked may have a faster pace of speech as opposed to the slow speaking pace of a calm caller. The faster paced caller would have a different sentiment than the slower paced caller. Based on the determined sentiment 118 of the incoming call, different handling processes may be implemented. For example, a caller with a poor sentiment (e.g., the caller is agitated and/or angry) may be routed to a customer service representative, whereas a caller with a good sentiment (e.g., the caller is calm and/or happy) may be routed to a voicemail system.

Additionally and/or alternatively, the urgency, criticality, and/or severity 120 of the incoming call may be analyzed by the network 109. The urgency may indicate a temporal (e.g., time-based) sensitivity of the call, such as determined using the NLP processes 112. For instance, if a caller explains that they need to speak with a representative "as soon as possible," a higher level of urgency may be assigned to the incoming call as opposed to a caller that says they need to speak with a representative "as time permits." The criticality of the incoming call may indicate how important the content of the call is to the caller. For instance, if the caller indicates that their entire communication system is down, the criticality of the incoming call 104 may be greater than if the caller indicates that their shared messaging system is down. Additionally, the severity of the incoming call 104 may indicate how bad the problem is for the caller. As an illustration, if the caller indicates that the phone system is down for 2 out of 100 branch offices, a lower severity may be assigned to the voicemail than if the caller indicates that the phone system is down for a higher percentage (e.g., 100 out of 100) of branch offices. Based on the urgency, criticality, and/or severity of the incoming call, different handling processes may be implemented.

As yet another illustration, the topic(s) and/or related context indications 122 of the incoming call 104 may be identified and different handling processes may be implemented in handling the user-data communication. For instance, using NLP 112, the topic(s) of the incoming call 104 may be identified. Voicemails pertaining to one topic may be handled differently than voicemails pertaining to a different topic. As discussed above, for such a discerned topic, one of multiple call-related context indications may be conveyed to one of the user endpoint devices, for informing on how the incoming call may be processed for a change to or from a parked call status.

Based on the various content analysis processes 124 implemented, different handling processes may be utilized to address the user-data communication (e.g., the voice call 102 illustrated in FIG. 1B). For instance, if based on the content analysis processes 124, the incoming call 104 is to be escalated to a live agent, the incoming call 104 may be interrupted and the voice call 102 may be routed to a representative via a virtual office system 106. As another illustration, if based on the content analysis processes 124, the incoming call 104 is to be routed to a virtual assistant system for additional processing and/or additional services for the caller, the incoming call 104 may be interrupted and/or routed to a data-communication provider server 108 for accessing the virtual assistant. As yet a further illustration, if based on the content analysis processes 124, a group of team members are to be notified of the call 102, a message 126 may be sent to a message system 110, connecting a plurality of representatives (e.g., employees or end-users) of the client entity with information about the incoming call 104. The message may include information identifying the caller, the priority of the customer, the date and time of the call, and additional information. The message may include a sentiment analysis, indicating that the incoming call 104 was highly negative, and very critical, with a sentiment and criticality score. The message 126 may also include a call analysis which includes a transcription of the call and a sentiment as determined from the voice of the caller. As illustrated in message 126, the sentiment as determined from the tone of the voice of the caller may differ from the sentiment as determined from the content of the voicemail. As such, different sentiment scores may be represented in the message 126.

As in the examples and aspects discussed in connection with FIG. 1A and other system-directed specific examples according to the present disclosure, call content analysis may be carried out with involvement by a data communications system including a server 101 of FIG. 1A to provide data communication services including inbound and/or outbound communication routing of data communications received by the server 101 in the form of one or more of various types of calls (voice, text, email, etc.) and including providing information to users (e.g., client entities) of parked call issues. For example, the server 101 may be configured to provide certain specific information for assisting client entities, using such services, for handling the calls relative to notifying the client entities of such calls being in a parked mode with status or context information, and/or with such information to facilitate effecting a change of the call relative to a parked call status.

Adaptations and/or more details of the system of FIG. 1A may include an IVR (interactive voice recognition) engine, call-monitoring circuitry for monitoring calls so that sentiments, terms, and the like may be compared with stored information collected from previous calls involving common call participant(s), and/or a call content analysis engine (e.g., an artificial intelligence engine) for analyzing outputs generated by the IVR and/or monitoring circuitry. As noted above, one such system-level example may have such data-processing circuitry and/or this type of content analysis as part of a unified call-center and intelligent call-routing system providing data-communications services as a platform-based solution. Other adaptations may involve configuring the data communications system as a Platform as a Service (PaaS) that provides a user with access to, among other things, telephone communication routing control, PBX functions, call center and computer telephony integration (CTI), and data analytics for use in analyzing incoming calls to the server and taking certain actions based on outputs of the data analytics. "User" in this general context may refer to or include one or more of an individual person, group of individuals, a server or other communication equipment of a client entity (e.g., an official company) which is registered to receive such services from the data-communications service provider.

This above-characterized processing circuitry may be used to monitor and discern different types of information from the call to be used in connection with parking calls or retrieving calls from being parked. As one example, such discerned information from the call may be used to indicate that a certain follow-up action (e.g., a courtesy "thank you" or survey, or call by/to a supervisor with an update on the call) is to be taken in connection with retrieval of the call from a parked-call status, and with the data-communications server conveying an indication of the certain follow-up action.

In another example, this discerned information may be used to monitor the call before causing the call to be parked, and in response to discern information from the call which indicates that the call should not be in a parked-call status at all or in a parked-call status beyond a certain time threshold. As a more specific aspect of this example, the discerned information may include caller ID information associated with the call and/or information previously gathered by the server. For example, the server may discern that the call is likely a spam call or another type of less-than-top-priority call for which a call-parking time limit (minimum and/or maximum) may be adjusted based on a discerned importance-related criteria associated with the call (such as the caller's ID information and/or information gathered from the call by an IVR before parking the call).

In yet another example, such discerned call information may be used to indicate that a certain action should be taken in connection with retrieval of the call from a parked-call status. The certain action may be one or more of: forwarding or handing off the call to certain individual or group, and routing the call to a destination address or endpoint device, with the data-communications server conveying an indication of the certain action; discern information from the call that includes or indicates at least one of a topic, an action, and a name derived from data previously-stored by the system, with a conveyance of data indicative of the discerned information to provide an insight while the call is parked or being retrieved from parked-call status; and discern information from the call including one or more of a filtered status (as above, where the filtering is used to identify caller identification data for the call and/or identify the geographic-location of the caller or the callee, and/or availability of the callee).

In yet a further specific example, a term recognized through such circuitry monitoring the call may correlate the term to a topic recognized from data previously-stored by the system. For example, such monitoring and correlation may be used in connection with previous calls being monitored where such call have common caller IDs and/or common terms shared in the calls (whether transcribed from an audio call or extracted via written text such as in call which is based on, refers to, or includes a text message or email) and wherein the terms are deemed likely to be useful for providing an insight about the call. In response, the server conveys data indicative of the discerned information to provide an insight while the call is parked or being retrieved from parked-call status.

In yet another example, such discerned call information may include or indicate: a filtered status corresponding to caller identification data for the call, with the filtered status being one of the aspects as discussed above; and front-end call-related information from the call including at least one of ID data relating to the caller and/or call. With data to identify a topic or subject matter surrounding the call, the discerned front-end information may be used for retrieving certain prospectively-related data from the memory circuit (e.g., all previous email-type calls and transcribed-audio calls and all attachments sent during such call) for such call that shares a caller ID number or a caller ID number. In response, the data-communications server may prompt the endpoint device to convey an icon (text message or other indicator) on its screen to provide an insight for handling the call upon retrieval of the call from a parked-call status.

Figure 2:
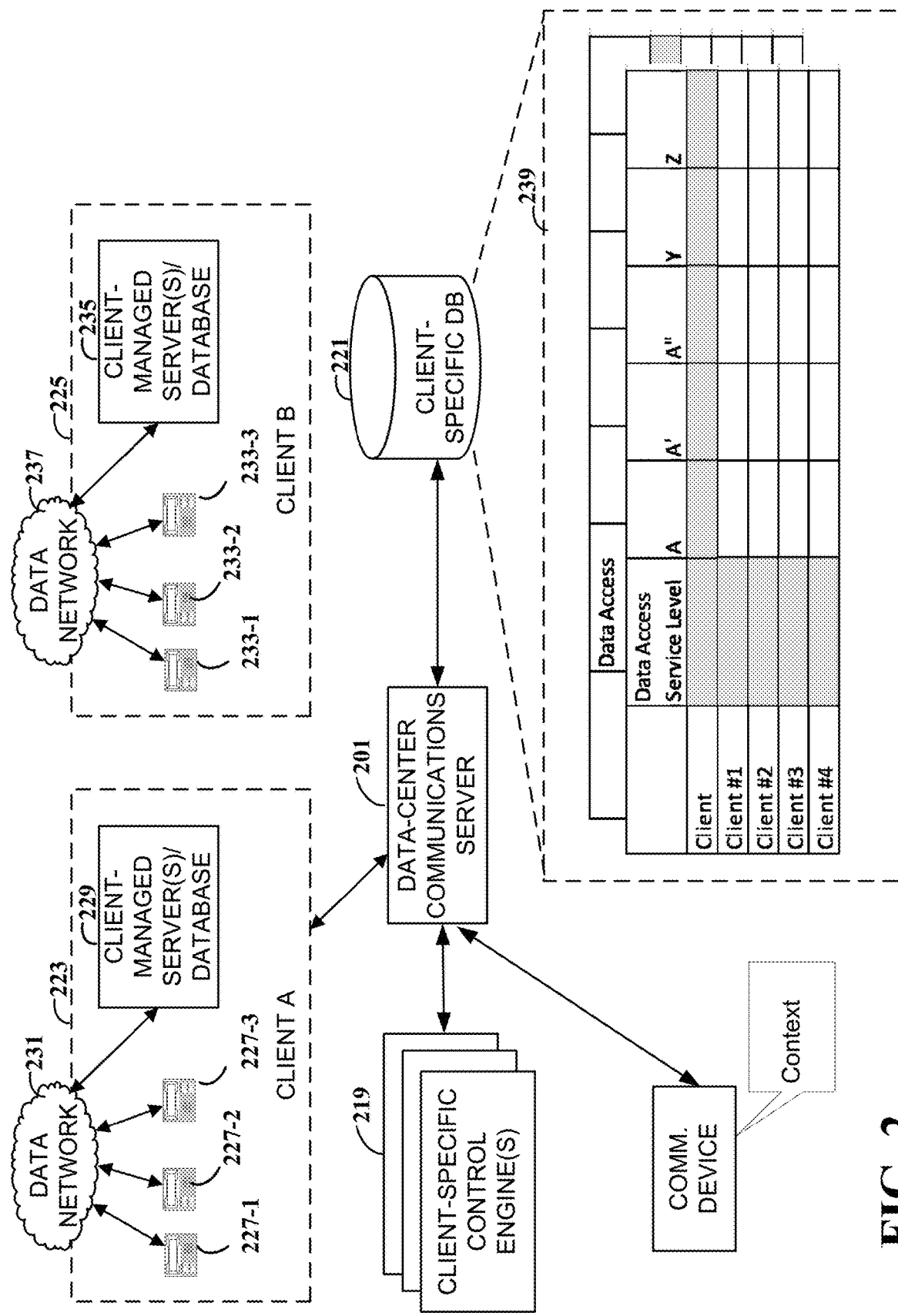
FIG. 2 is a block diagram of an example data communications system for client-specific data communications for monitoring calls and notifying endpoint devices as a function of such monitoring, according to aspects of the present disclosure.

FIG. 2 illustrates a block diagram of an example data communications system for client-specific data communications monitoring, consistent with the present disclosure. The system includes a data-center communications server 201 configured to provide data communications for a plurality of endpoint devices 227-1. 227-2, 227-3, 233-1, 233-2, 233-3, connected in one or more data networks 231 and 237.

The endpoint devices may include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data communications server. Registered devices for each client account may be listed in a respective account settings file (not shown) stored by the data-center communications server 201. In this example, endpoint devices 227-1, 227-2, and 227-3 are associated with an account 223 for a first client A and endpoint devices 233-1, 233-2, and 233-3 are associated with an account 225 for a second client B.

The system includes one or more processing circuits configured to implement client-specific control engines 219, which are configured to adjust the data communications provided for each client account according to a respective set of control directives. For instance, the client-specific control engines 219 may adjust a manner in which endpoint devices 227-1, 227-2, and 227-3 are controlled, and/or a manner of routing of a data communications for a client account, by generating client-specific sets of control data to the data-center communications server 201. For example, the client-specific control engines 219 may generate client-specific sets of control data by processing the respective set of control directives for the account in response to communication event data or other data prompts received from the data-center communications server 201.

As previously described, client-specific control engines 219 may be used to facilitate control of endpoint devices associated with a client device. The control of the endpoint devices may be associated with a variety of virtual office features including, for example, data communications services such as VoIP calls, audio and/or video conferencing, IPBX exchange servers, packet switching, and traffic management as well as non-data communications services including, but not limited to, website hosting, remote data storage, remote computing services, and virtual computing environments. One or more of such virtual office features may be provided, for example, by a cloud computing network having one or more servers configurable to provide a data communications system for a plurality of clients.

Each respective client entity may have a client-managed server and/or database. For instance, Client A may be associated with a client managed server or database 229, whereas Client B may be associated with a client managed server or database 235. The client-managed server may facilitate the routing of data communications between the respective endpoint devices and the data-center communications server. Similarly, the client-managed servers may, in some example embodiments, analyze the sentiment and criticality of communications sent to and/or received by the respective endpoint devices, as discussed herein. In some example embodiments, each respective client entity may have a database storing client-specific preferences correlating different sentiment scores and criticality scores with different handling processes.

Additionally and/or alternatively, the data-center communications server 201 may be communicatively coupled with a client specific database 221, storing service level subscriptions 239 for each of a plurality of client entities. For example, the data communications service provider may provide a plurality of different service levels for the clients.

Each disparate service level may provide additional services and/or information to the client entity, relative to past communications handled and subsequent communications to be handled by the service provider. For example, Client A 223 and Client B 225 may be associated with a home improvement store and an adhesives manufacturer, respectively. Service level A, which may be offered to both Client A and Client B, may be associated with routing communications for Client A and Client B, and also providing information to the clients regarding customer purchase data. The purchase data may include information about how many products were purchased, when they were purchased, which products were associated with problems and/or an increased number of customer complaints, and the like. Similarly, a second service level (e.g., service level A') may include the services of the first service level (e.g., service level A) but also information on venue and regional demographics. For instance, Service level A', which may be offered to both Client A and Client B, may be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") may include the services of service level A' but also information on venue and relative pricing grouping. For instance, service level A", which may be offered to both Client A and Client B, may be associated with routing communications for Client A and Client B, providing information to the clients regarding customer purchase data, providing information about demographic populations, and information regarding relative prices which each demographic population is willing to spend. Additional service levels (e.g., service level Y and service level Z illustrated in FIG. 2) may be specified. Each respective client entity (e.g., client #1 through client #4) may have a specified level of data service access provided by the data-center communications server 201.

Rules of various complexity can be used for routing incoming communications, whether to one or more receptionists, directly to extensions, to voicemail, or for other communication routing purposes. Similarly, rules of various complexity can be used to control devices associated with particular client entities. The logic used for the control of the networked devices can be based upon directives and related data shared across multiple PBXs, data that can be dynamically changed, and upon rules and logic that can be defined according to multiple tiers of communication routing decisions. For example, a large company may have many different offices or store locations. Portions of the communication routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating of the data communication system, particularly in situations where there are many thousands of extension rules which can be a difficult proposition.

According to certain specific examples, a data communications system may be configured to allow a client-specific control engine to dynamically modify and control the communication flow of call-parking communications which may be involved in such routing decisions. These decisions may be realized by processing aspects of such decisions at different levels within the system, including (re)routing of incoming communications. Such a client-specific control engine may be associated with client-specific sets of control data to define a manner in which various networked endpoint devices are to be controlled via the data communications system. For example, various endpoint devices may be capable of voice interaction, music playback, making to-do lists, setting alarms, streaming podcasts, playing audiobooks, and providing weather, traffic, and other real time information, such as news. In such examples, the client-specific sets of control data may specify how frequently the networked devices collect data, how frequently data is communicated between various networked devices, and under what circumstances and conditions endpoint devices may initiate a call capable of being parked and/or retrieve a parked call. Such endpoint devices may be any of the types of devices discussed herein and including IoT as described below.

Similarly, client-specific sets of control data may define a manner in which endpoint devices may be controlled and/or monitored by the data communications system. For example, networked devices (e.g., IoT) may include devices for home automation (also known as smart home devices) that control automation of lighting, heating (like a smart thermostat), ventilation, air conditioning (HVAC) systems, and appliances such as washer/dryers, robotic vacuums, air purifiers, ovens, or refrigerators/freezers. By using call-parking related features, the client-specific sets of control data may define a manner in which such networked devices communicate with the data communications system, a manner in which they communicate with one another, various parameters for remote monitoring of the networked devices, and the like. In some examples, the client-specific sets of control data may specify particular individuals and/or groups of individuals associated with a client entity that may access and/or control the networked devices associated with the client entity, using the data communications system. For example, the service provider may be providing data communication services, including call parking data services, to a client entity which has such IoTs managed for one or more facilities by an administrator with a smartphone including a GUI exemplifying display and feedback with respect to use of IoT-based management of the facilities. With such IoT devices being coupled to receive message-type calls from the administrator, the administrator may send instructions (in the form of such message-type calls) to one more of the IoTs while using previously-customized client-specific data to indicate what types of actions and notifications to provide regarding the IoTs. In one such example, the administrator sends several message-type calls to respective ones of the IoTs and the system server responds by parking these calls, with notifications back to the administrator to take certain actions (e.g., turn on shut down the IoT-controlled appliance under certain conditions), wherein upon retrieving parked calls the administrator is notified what actions to take and the administrator may then terminate the calls in connection with taking such action. As a more specific example, the administrator may use an IoT as an endpoint device to detect the condition(s) and to call an endpoint device linked to the administrator to prompt the administrator to retrieve the parked call and related notification.

Figure 3:
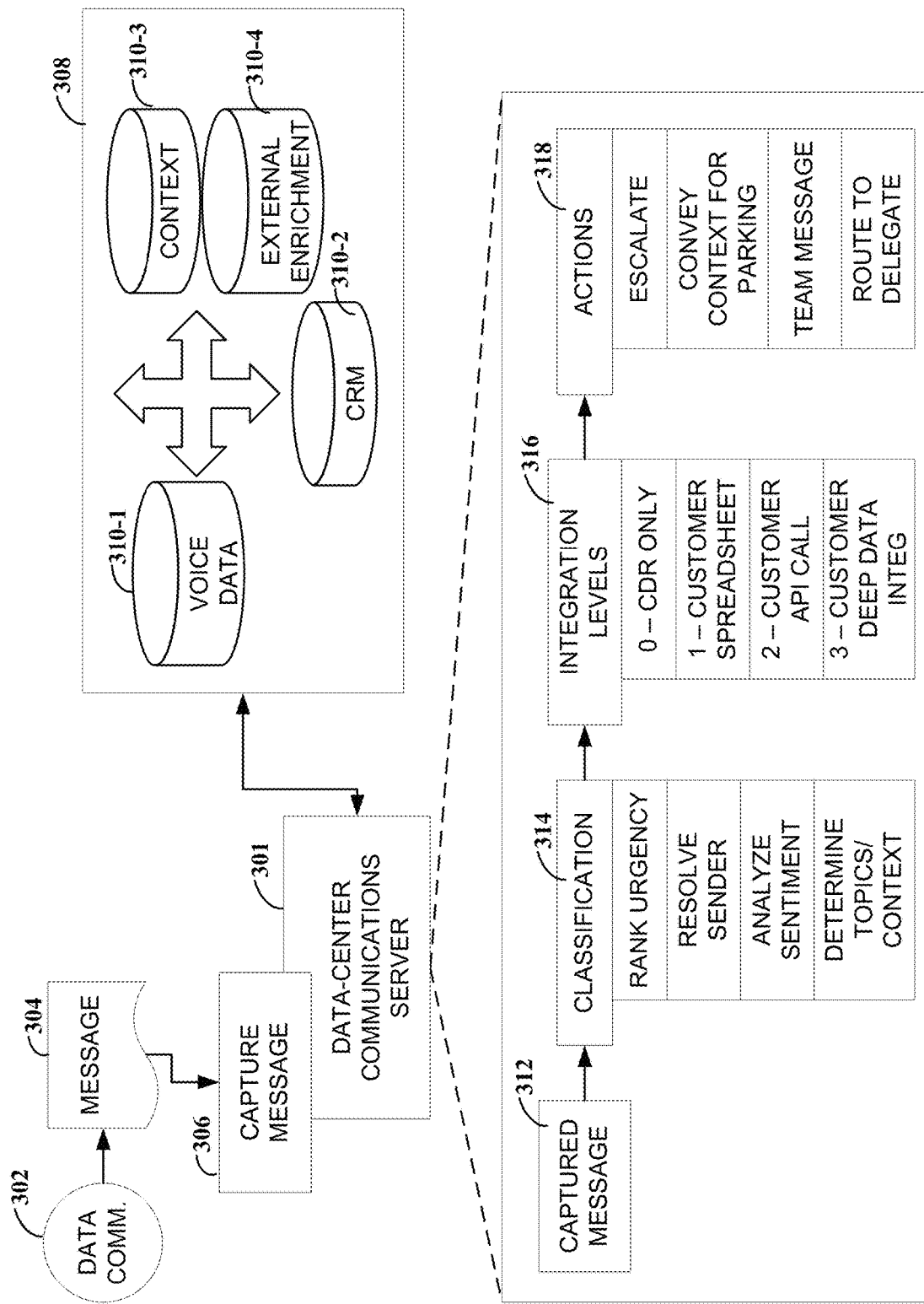
FIG. 3 is a flow diagram illustrating an example method for monitoring user-data communications and notifying endpoint devices with regards to parked calls, consistent with one or more of example embodiments of the present disclosure.

FIG. 3 illustrates a flow diagram illustrating an example method for monitoring user-data communications, consistent with embodiments of the present disclosure. In connection with these specifically-illustrated examples, data communications endpoint devices connected in a data network are configured to place and receive data communications between other data communications endpoint devices, and/ or between non-data communications endpoint devices, for example, as discussed above in connection with FIGS. 1A and 2 and other example embodiments and aspects of the present disclosure. Non-data communications endpoint devices may include, for example, plain old telephone service (POTS) telephones and cellular-capable devices, which might also be data communications capable (e.g., smart phones with appropriate data communications software applications). The various endpoint devices include circuitry that is specially configured to provide communications functions that include interfacing with the appropriate circuitry of the communication service provider used by the corresponding endpoint device. In many examples such as with FIG. 3, a data communications endpoint device is a data communications-capable telephone commonly referred to as IP phones. The data communications endpoint devices can include, but are not limited to, desktop computers, mobile (smart) phones, laptop computers, and tablets. When each of the endpoint devices originates or receives a communication in a telephone network, each can be characterized or referred to as an addressable communication endpoint.

The communication routing and other services for the data communications system can be provided by one or more data-center communications servers 301 within a cloud services system (e.g., configured to provide virtual office features to customers of the data communications provider). In particular example embodiments, the data-center communications servers 301 can be located within the cloud services system (e.g., data network 109 illustrated in FIG. 1A). The cloud services system also includes one or more provider hosted client-specific control engines, configured as described with reference to 119 in FIG. 1A. A client-specific control engine may also be implemented locally by a client (e.g., by a client-managed server as illustrated in FIG. 1A at reference numeral 107, and in FIG. 2 as reference numerals 229 and 235). In some embodiments, data centers can be part of a cloud-based system where the hardware providing the cloud services is located in a number of different data centers with different physical locations. Consistent with embodiments, the cloud services can include SIP servers, media servers, and servers providing other services to both data communications endpoint devices and the users of the data communications endpoint devices. In some instances, the various servers, including the data-center communications server(s), can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data-center communications server uses session initiation protocol (SIP) to handle various communication functions (e.g., communication setup and tear down); however, the various embodiments discussed herein are not necessarily limited thereto. Consistent with the above and other embodiments disclosed herein, the data communications servers can be configured to establish a portion of the communication from the data communications endpoint devices to another data communications endpoint device, or to a gateway.

As illustrated in FIG. 3, an incoming data communication 302 (or call) may be received as a call from an endpoint device. In various example embodiments, the transmission of the data communication may be facilitated via a computing server configured and arranged to interface with a plurality of remotely-situated client entities to provide data communications services on a subscription basis. Each respective client entity may be associated with a different respective client-server, as described herein. As such, the transmission and receipt of such data communications may be facilitated by a processing circuit, such as the respective client-server, communicatively coupled to the computing server and configured and arranged to provide data communications services to the various endpoint devices of the client entity.

Upon receipt of a respective call 302, the client-managed server may route the call, direct the call to a message recording system, and/or cause or enable the call to be parked. In some example embodiments the received communication may be a voice call, in which case the voice call may be routed to a voicemail recording system or transcribed while being monitored for processing such as discerning a topic or related context indication as may be used in connection with parking the call or retrieving the call from a parked status. As described herein, the received call may be addressed to a client among the plurality of remotely-situated client entities served by the data-center communications server 301. A message 304 may be generated, corresponding to the call 302, such as if the sender of the data communication were to record a voicemail via the data-center communications server 301.

Parameters of the call or message may be determined. For instance, at 306, the message may be captured in data form such that various aspects of the message may be analyzed. In example embodiments in which the call is a voice message, the captured message 304 may be transcribed or otherwise converted into a script which may be analyzed by the data-center communications server 301. For instance, during recording of a message associated with the received voice communication and on the message recording system, the data-center communications server 301 may analyze speech characteristic parameters of the message.

As discussed herein, during recording of the message, the data-center communications server 301 may determine a sentiment score and a criticality score for the message based on the analyzed speech characteristic parameters. In various example embodiments, the data-center communications server 301 can determine the sentiment score and the criticality score for the message by identifying key words in the message, analyzing natural language of the message during recording of the message, and determining at least one topic of the recorded message. Based at least in part on the identified key words, the received voice communication can be classified. For instance, the sentiment score and the criticality score for the message may be determined by identifying a tone of the message. In such example embodiments, the speech characteristic parameters may be selected from the group consisting of: a frequency of audio in the message, a wavelength or velocity of the audio in the message, an amplitude of the audio in the message, and a combination thereof, and the tone may be determined from such speech characteristic parameters.

In various embodiments, the received voice communication may be classified at least in part based on the sentiment score or the criticality score. In classifying the received communication, the data-center communications server may retrieve from a plurality of sources 308, data associated with the particular client entity to which the communication was directed. For instance, the data-center communications server 301 may retrieve from a client-specific database (such as 221 illustrated in FIG. 2), a set of rules associating the voice communication with at least one communication handling process. The data-center communications server 301 may also access customer relationship management (CRM) data from a CRM server 310-2, including information about the particular client entity, services and/or products purchased by the particular client entity, previous communications with the particular client entity, and names and contact information of individuals associated with the client entity. Additionally and/or alternatively, the data-center communications server 301 may access a voice data server 310-1, which includes audio recordings from previous communications with the particular client entity, transcripts from previous communications, and/or information about such previous communications with the particular client entity. Based on these analysis efforts and for situations in which the call is to be parked, the message may be used to determine and/or convey a topic or related context indication discerned from the monitoring/recording of the call.

The CRM server 310-2 and voice data server 310-1 may further be in communication with a context server 310-3 and an external enrichment server 310-4. The external enrichment server 310-4 may include information regarding communications services accessed by the plurality of remotely-situated client entities, the communications services including an email system and a text-based chat system, among others. The context server 310-3 may identify a context of the voice communication based on the CRM data, information in the email system, or information in the text-based chat system. The data-center communications server 301 may further be in communication with each of the voice data server 310-1, CRM server 310-2, context server 310-3, and external enrichment server 310-4. As such, the data-center communications server 301 may determine the sentiment score or the criticality score based at least in part on an identified context of the voice communication.

As described previously herein, the data-center communications server may retrieve from a database communicatively coupled to the processing circuit and the computing server, a set of rules associating the voice communication with at least one communication handling process. For instance, each respective client entity may specify a manner in which incoming communications should be handled in response to a sentiment score and/or criticality score reaching a specified threshold. Accordingly, the data-center communications server may, during recording of the message, process the voice communication according to a set of rules associated with the particular client entity and retrieved from the client-specific database. As an illustration, the data-center communications server may process the voice communication by interrupting recording of the message and routing the voice communication to a live operator, responsive to a threshold for the sentiment score or the criticality score being satisfied. The caller may receive a message indicating that the message has been interrupted and the call is being routed to a live agent for handling. Example embodiments are not so limited, however, and the received data communication may be handled in additional and/or alternative manners. For instance, the data-center communications server may process the voice communication by sending a message to a recipient of the voice communication, responsive to a threshold for the sentiment score or the criticality score being satisfied. Such message may be sent to the target recipient by email, text message, and/or chat message during recording of the message to urgently alert the recipient, the existence of the message. As another illustration, the data-center communications server may provide the recipient with a selectable option to answer the voice communication during the recording of the message, responsive to the threshold for the sentiment score or the criticality score being satisfied.

In some example embodiments, the data-center communications server may determine the criticality of the voice communication based on a determined topic of the voice communication, a determined sentiment of the voice communication, or an identity of an individual or organization which originated the voice communication. Various levels of analysis may be implemented by the data-center communications server 301 in order to determine the sentiment and/or criticality of a respective data communication and/or, for situations in which the call is to be parked, to convey a topic or related context indication discerned from the call. For instance, the captured message 312 may first be classified at 314. In classifying the captured message, an urgency and/or criticality of the captured message may be identified. The urgency may refer to or include a level of time-based sensitivity of the received communication, whereas the criticality may refer to or include a relative importance of the topic of the communication (which may or may not be urgent). Additionally, the sender of the communication may be identified. As discussed herein, the identity of the sender (e.g., the individual and/or the organization which the individual is associated with) may assist in a determination of the sentiment and/or the criticality. During the classification 314, the sentiment of the communication is analyzed, and at least one topic and/or related indication of context of the call may be identified, as discussed herein.

Additionally, a number of integration levels 316 may be implemented, based on the service level associated with the particular client entity. For instance, a particular client entity may purchase a base level (e.g., level 0) integration level in which communications from the customer are rerouted based on the identified sentiment and/or criticality. Similarly, the client may purchase a second level (e.g., level 1) integration level in which communications from the customer are rerouted, but a customer spreadsheet is also maintained for rerouting such communications, and data is collected which may be used in subsequent communication routing, as discussed herein. A third integration level (e.g., level 2 integration) may provide a customer application programming interface (API), and a fourth integration level (e.g., level 3 integration) may provide a deep data integration for routing of communications. In the level 3 integration, data from databases 310-1, 310-2, 310-3, and 310-4 may be used to route and/or respond to incoming data communications such as data communication 302, and various customer data may be collected and provided to the client entity as discussed with regards to FIG. 2.

A number of actions 318 may be selected and/or implemented based on the classification 314 and the integration levels 316 specified for each respective client entity. For instance, a particular client entity may specify that if a particular sentiment and/or criticality score is met, then the data communication is escalated to a particular level of customer service representative. In some embodiments, the communication may be escalated to a particular individual. Additionally and/or alternatively, the communication may be escalated to a particular group.

As another illustration, the action 318 selected based on the sentiment and/or criticality may include sending a message, in the form of an indication of a context of the call, to the endpoint device targeted by the call and in this manner, the call may be parked by the user of the endpoint device based at least in part on knowing this context. For instance, if a call is placed to an endpoint device of Jeff Jones, and the call meets a particular criticality score (e.g., the call is about "project purple") then Jeff Jones may be sent a context message in the form by a secondary means such as by email, text message, or the like. In yet another illustration, a group of individuals and/or a team may be sent a message when a particular data communication is received. For instance, if the data communication or call 302 includes key words and/or phrases which suggest that the customer is communicating about a system failure (e.g., "my application is not running at all and I need to communicate with my clients immediately!"), the data communication may trigger a context-based indication in a message to one or more endpoint devices of a team of IT professionals which are capable of parking the call and hopefully addressing the system failure and/or are otherwise specified as a team which is responsible for responding to such system failures. Additionally and/or alternatively, a particular client service representative and/or delegate for a customer may be contacted for handling and/or otherwise responding to the received communication.

While particular actions 318 are specified in FIG. 3, it is noted that each respective client entity may customize and/or alter the actions to be provided for received data communications. Referring again to FIG. 2, each of Client A and Client B can specify thresholds, triggers, key words, tones, phrases, and/or other parameters that may be used to classify incoming data communications at 314. Each of Client A and Client B can specify a level of integration that should be implemented, which specifies a number of different data sources that should be accessed in classifying communications and selecting particular actions to be implemented. Such integration levels may further assist in machine learning, as data from external sources may allow for the prediction of sentiment and/or criticality of various data communications. Additionally, each of Client A and Client B can specify particular actions to be performed when such classifications are met. As discussed herein, the actions may be dynamic, in the sense that each client entity can view, modify, add and/or delete actions to be performed, and otherwise interact with the system to improve the functioning of the machine learning algorithms described herein.

In connection with specific examples of GUIs implemented according to aspects of the present disclosure, different types of notifications and data may be used with respect to call-parking statuses and further enhanced by providing additional information. This additional information may include general or specific contextual information for a parked call and/or possible follow-up actions discerned from monitoring aspects of the call and/or by way of previously-stored information that is associated with the parked call (e.g., caller ID data, client name, and/or topic). These features enable users to take further actions with respect to a parked call (e.g., POS transaction, help desk ticket management, messaging, video chat, etc.) sometimes based on the GUI-context displayed for the parked call. Specific examples of statuses and contextual information, relevant to parked calls, may display the data in different manners with the user discerning from the displayed information specifics surrounding the parked calls such as: how long has the call been parked; who is the original caller of the parked call; who parked the call; and what is the original destination of the parked call.

Figure 4A:
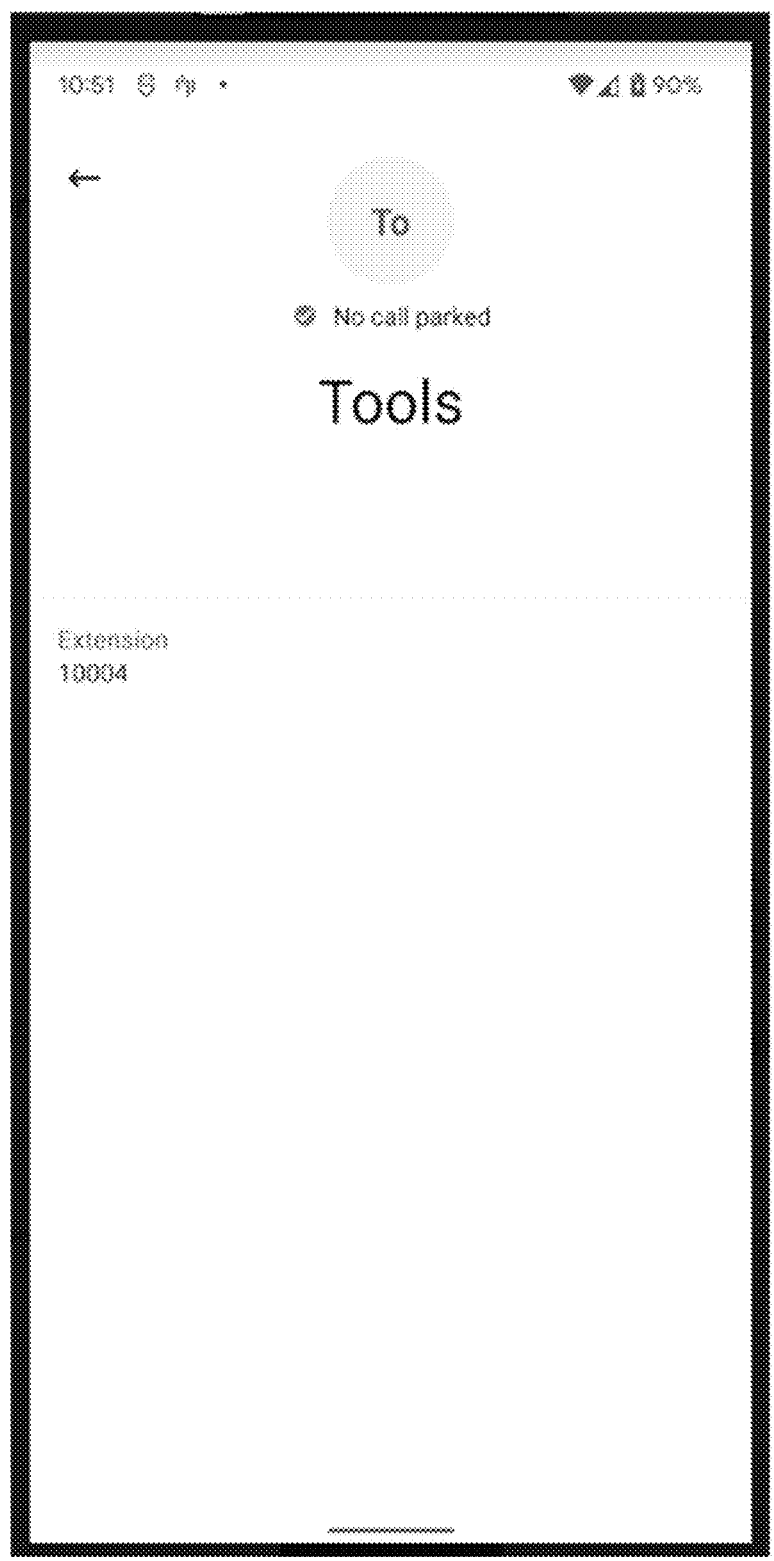
FIGS. 4A, 4B, 4C and 4D are respective screen shots illustrating manners in which a user interface may display and be used to communicate (e.g., visually convey and solicit user feedback) aspects with regards to parked calls, consistent with example embodiments of the present disclosure.

For certain of example consistent with the present disclosure which use such parked-call features with a GUI (such as on a mobile device or other endpoint device), FIGS. 4A-4D provide some non-limiting examples of screenshots which exemplify some of the different types of notifications and data which may be used with respect to call-parking statuses and further enhanced by providing additional information. FIG. 4A is a screen shot of a GUI which may be used to exemplify screen shots by way of an example screen for a scenario in which the GUI is conveying a Call Parking Extension feature with call parking extension detail view for "When No Call is Parked" as illustrated. As displayed in this screenshot, the extension number ("Extension 10004") is to inform the user of the endpoint's GUI of the cloud extension number on which the system might park a call if needed but at this time there are none as indicated by the notation "No call parked". Also, the system may be configured for this GUI screen to permit the user to tap the portion of the screen which displays the extension number to check if the line may be activated (e.g., as indicated by a dial tone).

Figure 4B:
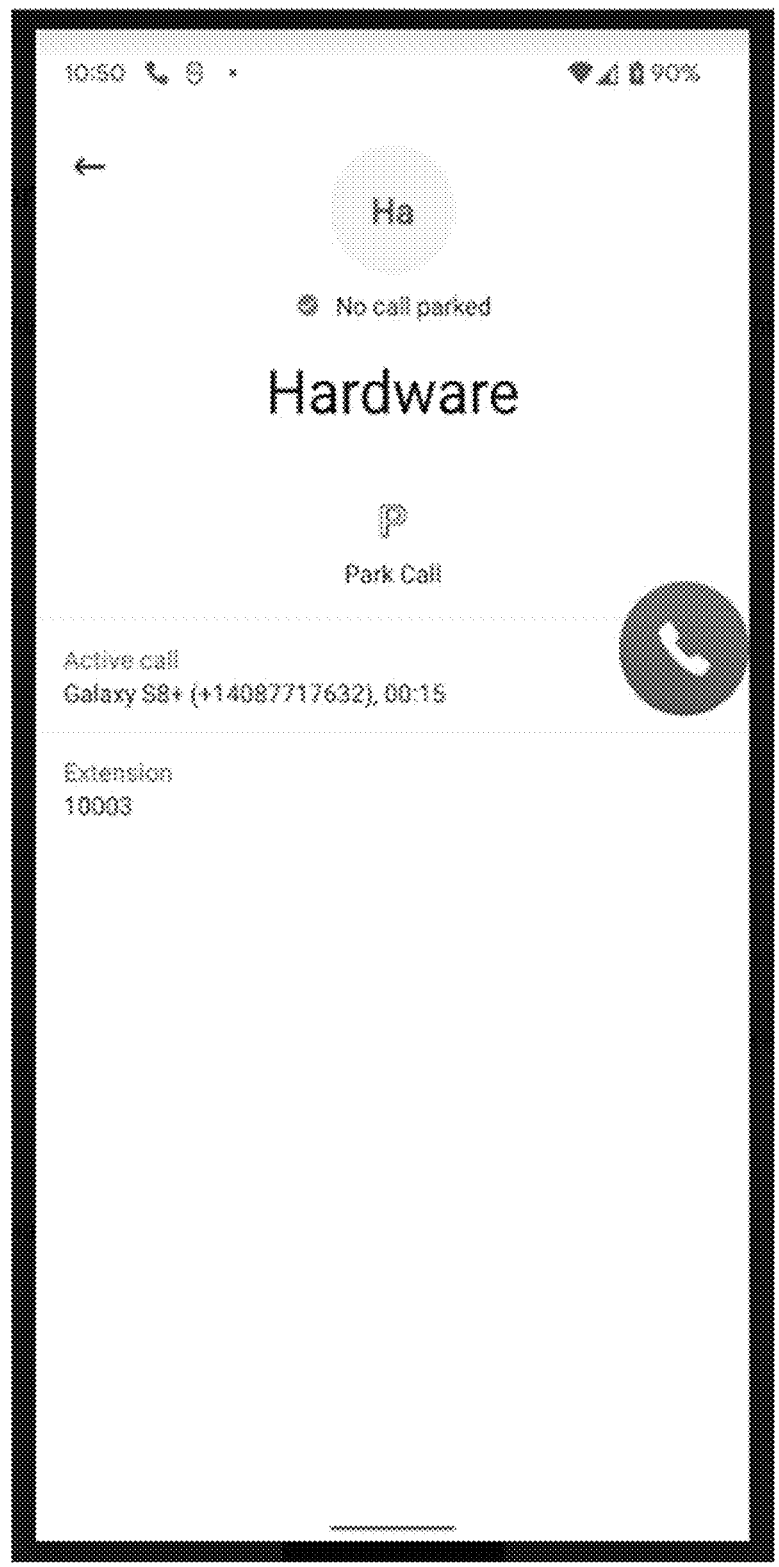

FIG. 4B is an example screen shot of a GUI which may be used to exemplify GUI-related operations for a scenario in which the GUI is conveying a Call Parking Extension feature with a call parking extension detail view "When You Have an Active Call" as indicated by "Active call" and an ID number for a Galaxy mobile phone shown on the screenshot of FIG. 4B. The screenshot may also display how long the call has been parked such as 15 seconds as indicated by "00:15". With this feature and while there is an active call that is parked, the endpoint device is enabled via the GUI to call that displayed extension number (e.g., "10003") to pick up the parked call. This pick up may be realized in certain endpoint device configurations by dialing that number on a keypad of the endpoint device and/or by tapping (touching) the portion of the display showing the number. In this example shown in the screenshot, the endpoint device may have the display configured to display a departmental status of whether active calls are parked along with another categorical status of whether active calls are parked (e.g., whether active calls are parked for another department or for a previous call processed by the user of the endpoint device).

In certain system configurations, the system may limit the length of a parked call to a maximum time (e.g., 5 or 10 minutes) before the call is directed to an IVR engine for automated processing or to a live person (e.g., operator) who may attempt to personalize a generic manner for processing the call such as by taking a message for the caller or redirecting/sending the message of the caller to a designated specialist/expert for the discerned topic/insight via a specific type of communication channel (e.g., email channel, VoIP, SMS) as may be requested by the caller or preferred by the callee.

In an another example scenario, the server may be configured (e.g., using a front-end engine such as caller ID, IVR and/or call analyzer engine(s)) to discern information and include the discerned information with one of multiple call-related context indications to the user endpoint device, so that the user endpoint device's GUI may display the context with the discerned information for informing the user on how the incoming call may be processed for a change to or from a parked call status. The discerned information may be based on identification data regarding a callee or an endpoint device of a caller which initiated the call and/or on a topic or insight relating to a likely issue involving the call.

In yet another example scenario, the server may be configured to permit the GUI of the user endpoint device to process the call by providing feedback to the server, with this feedback requesting that the call be retrieved by an IVR/call-analyzer function with possible follow-up actions. The follow-up actions may include, as examples, the IVR engine leading the caller to go to voicemail, one or both of the IVR and the call-analyzer engine being used to gather more information regarding the call for more accurate insight/topic discernment, and offering the call to be forwarded to a special department which might provide an expert to process the call or retrieve the call from a parked status.

In the situation where the IVR and/or the call-analyzer engines are able to gather more information or discern an insight regarding a focus or particular issue of the call, an initial or further related insight/context may be sent from the server to the GUI of the user endpoint device. As another step, the caller may be asked to confirm (e.g., through the IVR) that the discerned information regarding the topic is accurate, and a confirmation icon may be indicated next to the status symbol on the GUI showing the call as being currently parked. The user may then choose how to process the parked call (e.g., through a GUI menu showing options such as: directly retrieve, forward to another department, handoff to a supervisor, request the server to re-route the call to a third-party specialist/expert having special knowledge on the confirmed topic (e.g., one of various departments of the client entity (company) to which the endpoint device is linked, a collections resolution expert, a human resource manager, etc.). For certain of the above example scenarios, such feedback may be provided by the user tapping a portion of the GUI display screen where, in certain examples (not shown) the screen may be configured to show such specific feedback-processing options such as "IVR" (which may or may not lead the call to leaving a voicemail) or "Request Analysis".

As another menu option, the GUI can display "Analysis-to-IVR-to-VM", where VM represents voicemail. This option is for the situation where the user knows that the parked call cannot be taken by a live person but does not want to have the parked call to be further processed (e.g., after being parked for a threshold period of time) by the IVR engine only to have the caller leave a voicemail through the IVR process. By tapping "Analysis-to-IVR-to-VM" on the GUI, the parked call is retrieved by the IVR engine which explains that a specialist will call the caller back within a designated period of time on a communication channel type preferred by the caller and to address a purpose of call. The IVR engine then asks the user to provide more information to identify the preferred communication channel (e.g., text back to JohnDoe@gmail.com) and to provide more information concerning the purpose of the call so that the specialist can optimally respond in the follow-up call. This information is then gathered by the IVR, and a record of the call is provided. The call analyzer (analysis engine) may also process the further information gathered from the call and further more-detailed or more-accurate insight/topic may be added to the record. The call may then be sent to the specialist where the call may be parked again but in this instance, with the GUI of the specialist's endpoint device showing that an expanded record of the call has been or is being provided. For example, this may be shown (e.g., immediately adjacent the parked call) using an icon or menu symbol to depict a memory-drum icon or a network link. By the specialist tapping such and icon or menu symbol the GUI would change to show detailed information from the record. It will be appreciated that this record may be used for various purposes in changing the call to or from a parked call status (e.g., before or after retrieving the call from a parked call status), to place the call through the IVR engine for another process such as voicemail or to gather yet further information, and in connection with configuring the server or a user endpoint device to perform a follow-up action concerning the parked call (for which the record may show particular advantage in choosing the follow-up action).

In the above or other scenarios also according to the present disclosure, such follow-up actions may involve a scheduling engine (communicatively coupled with the server and/or one of the user endpoint devices) that is configurable to prompt a certain follow-up action to occur at a pre-scheduled time. The scheduling engine may be operated by the server in conjunction with the IVR engine, whereby after the IVR engine retrieves parked call (as may be forced by a user or occur automatically after a threshold duration of say 10 minutes of the call being parked), and the IVR engine then asks the caller what, if any, special actions may be requested as a follow up to the call. If the IVR engine cannot discern how to implement one of the requested special actions, the IVR may engage the call (content) analyzer to assess the IVR interaction and have the IVR suggest one or more special actions to the caller. The IVR (or more generally processing circuitry also as part of the server) then configures the scheduling engine to prompt the server and/or one of the endpoint devices to take such special action. Should the special action involve the server causing another call, the scheduling engine may be used to cause this other call to occur at a given time.

This type of scheduling process may also involve use of IoTs as disclosed herein, for example, using the scheduler engine and the IVR as a reminding mechanism to prompt or cause engagement of an IoT or cause a call to occur based on a detected action involving an IoT For example, consider a detector in a facility of a client entity which is a subscriber of call routing services from the server of FIG. 1A. The detector suspects, due to unexpected variations of temperature in certain timeframes, a malfunction possibly caused by an intermittent failure of an IoT-enabled thermostat. In response, the detector initiates a call to an endpoint device linked to the facility maintenance department, and the call is parked with no retrieval for the maximum time period allowed for parked calls. Consequently, the IVR engine and/or call analyzer determines that the call originated from this client entity's IOT thermostat (e.g., by caller ID data in the call such as a caller ID of a phone call or the device ID of the IoT thermostat as used in an email-type call from the IoT device), and in response, the IVR prompts the call scheduling engine to continue initiating follow-up calls on one or more channel types every 20 minutes until one of the calls is retrieved by a live person or acknowledged by the department as being processed and/or resolved.

Figure 4C:
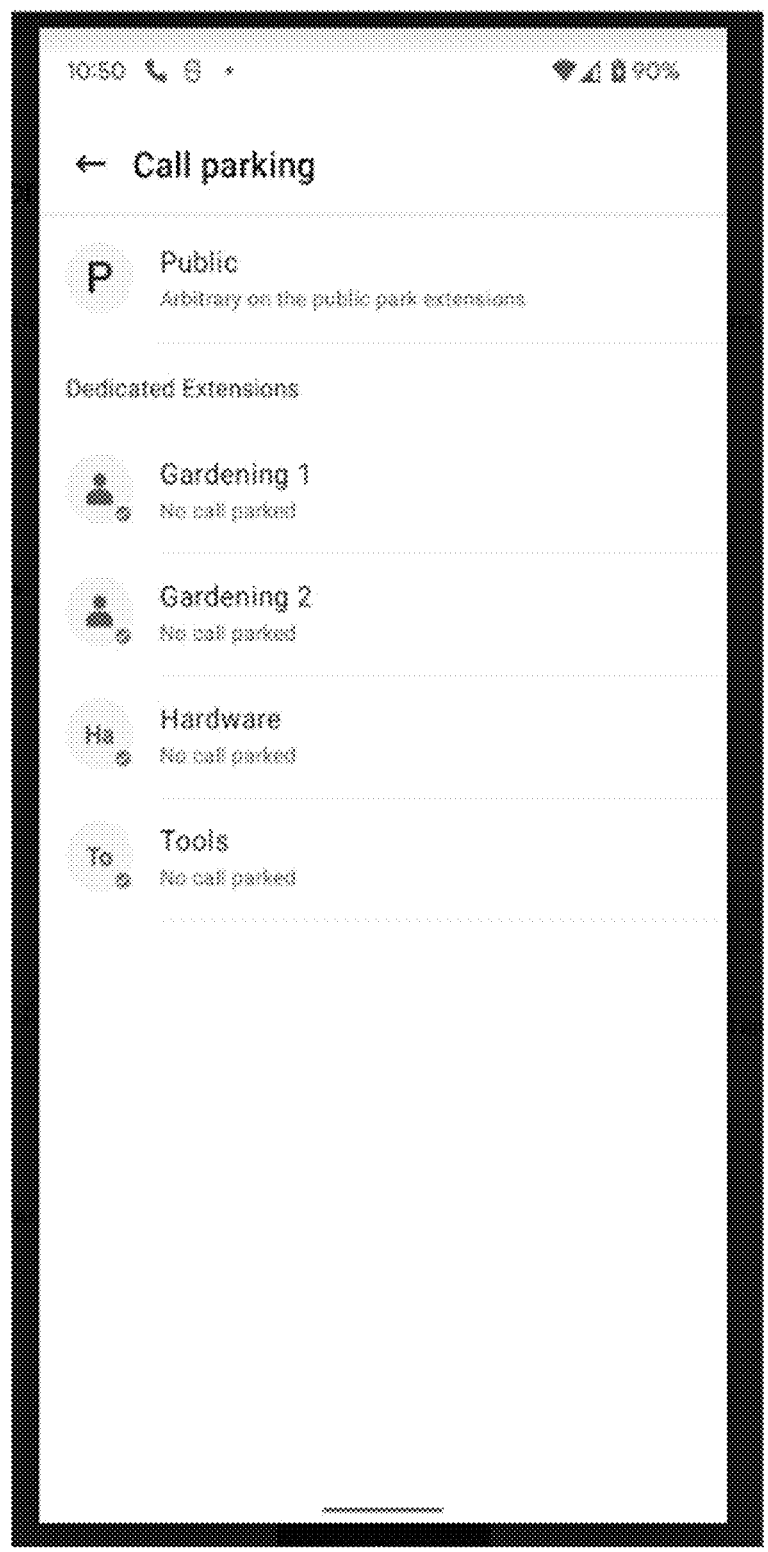

FIG. 4C is a screen shot of a GUI which may be used to exemplify screen shots by way of an example screen for a scenario "When you Press Call Parking on Active Call". The first displayed item in FIG. 4C is "P" indicating an arbitrary place among various publically-available extensions for parking the active call. By tapping the "P", the call is parked accordingly and may be retrieved as indicated in a manner similar to that shown in FIG. 4B. Below the "P", dedicated extensions are listed and these include two extensions of gardening departments and respective extensions of a hardware department and a tools department. For each of these departments, the display shows that no calls are currently parked, and the user may park an active call on any one of these extensions for later retrieval by that same user or a different user (e.g., a member tasked to handle calls in that department).

Figure 4D:
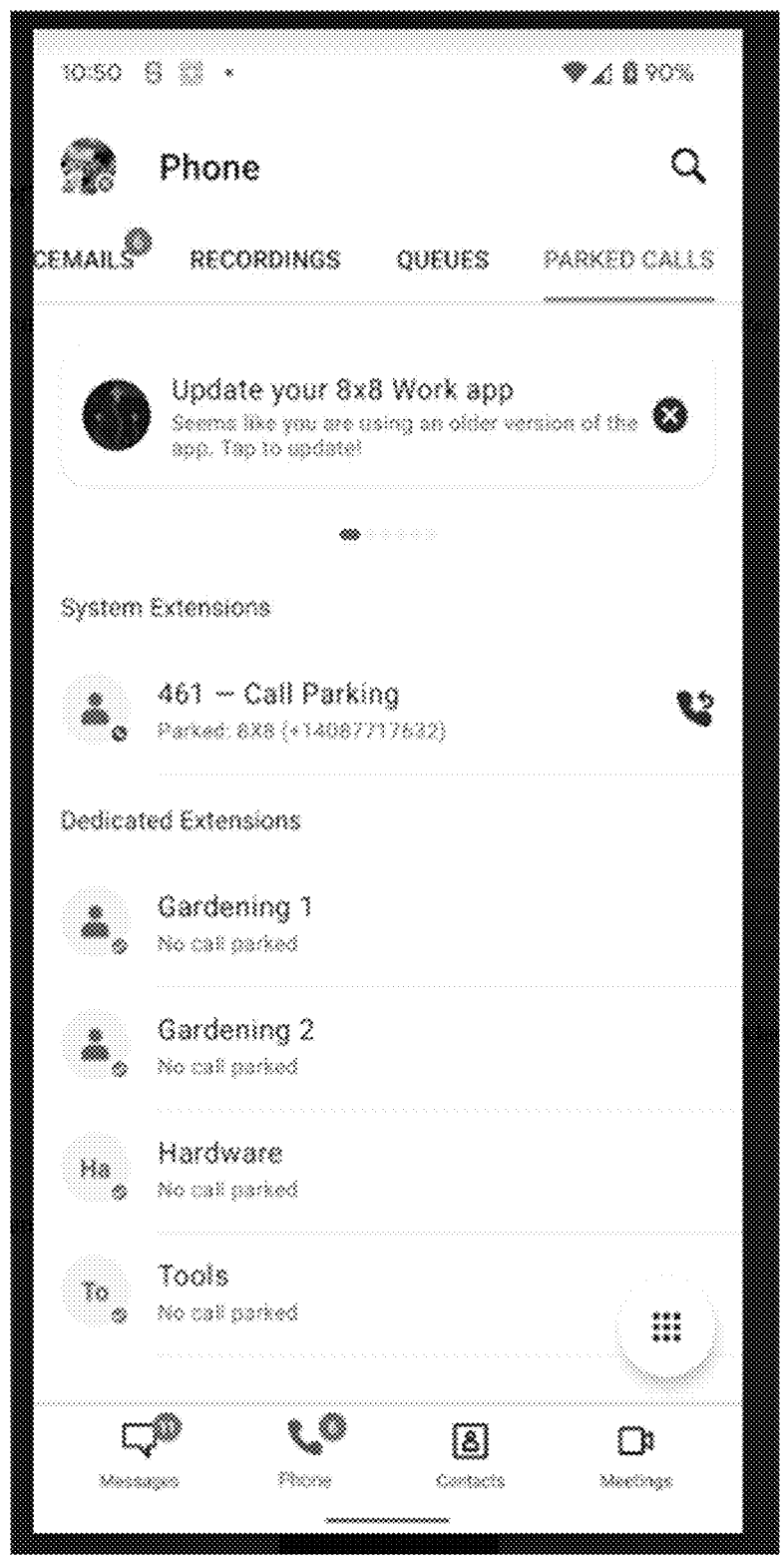

FIG. 4D is a screen shot of a GUI which may be used to exemplify screen shots by way of an example screen for a scenario in which the GUI is conveying a Call Parking Extension feature with Call Parking Sub-Tab in Call Tab When There is an Active Call. Accordingly, FIG. 4D shows a mode for the GUI to provide to the user, display of the aspects shown in FIG. 4C, but with the status showing a call parked at extension 461 after the user parks such a call (e.g., by tapping "P" in FIG. 4C), and also showing various other tabs (aka icons, symbols, or display components). These other tabs include: a tab for "parked calls" (among other data-communications processes including voicemails, recordings and queues) along the upper horizontal bar as shown in the screenshot being highlighted to produce the lower portion of the screen as shown; and also higher-level data-communications processes or functions for which the endpoint device is enabled (e.g., messages, audio phone call, contacts and meetings).

In other richer UX example scenarios, the screen of FIG. 4D (as part of smartphone or other endpoint device) is part of an endpoint device that receives data-communications services, including call routing and call parking, from a data-communications server such as in one of the above-disclosed systems (e.g., FIG. 1A). In addition to one of more of the features discussed above in connection with FIGS. 4A-4D, in certain specific implementations call-related context indications that are received from the data-communications server, are to be included as GUI-displayed messages (e.g., icons, short text-based quips, symbols, acronyms, etc.). These GUI-displayed messages inform the endpoint device (e.g., smartphone) user on how the incoming call may be processed relative to a change to or from a parked call status. In certain instances, such server-provided call parking services may include conveying to the endpoint device related information so as to enable the endpoint device to display on the GUI further data concerning the call (e.g., historically-related communications and/or alerts), thereby providing insights and suggestions to the user on how the call might be retrieved and how a change in the call's parked status might be optimized through further call processing.

Manners in which the contexts and/or possible actions are to be displayed may vary. As examples, they may be conveyed on the GUI's display by way of displaying suggested actions directly on the screen with a clear indication of the status of the context ("call concerns service of defective lawnmower, likely case #452A998") and/or with one or more suggested actions to be taken in connection with retrieving the call (e.g., "suggest to transfer to maintenance department"). For the one or more actions to be suggested, these action may be accessible via drop down menus (e.g., a menu showing "forward call", "handoff call", transfer call to supervisor, etc.). In this exemplary manner, the data-communications server and endpoint devices may be configured to convey one of multiple call-related context indications to the smartphone for informing the user of the smartphone on how the incoming call may be processed relative to a change to or from a parked call status and further, with feedback provided from the user's smartphone (or another endpoint device or autonomous resources such as an AI/ML engine coupled to the server), such a parked call may be viewed for processing with a mindset edified by significant additional information (e.g., accessible via the GUI's display) about the subject matter concerning the call.

Further, each of the call-related context indications may be based at least in part on one of the different types of calls and different respectively-corresponding communications channels on which the incoming call is received by the data-communications server. The call-related context indications to the smartphone may also be based at least in part on a user preference of one of the different types of calls and different respectively-corresponding communications channels on which a parked call is to be retrieved, and the data-communications server may cause a communication to be sent to the smartphone to convey that the caller ID is linked to another endpoint device (e.g., another smartphone or a home desktop CPU-based device) which is to be used for retrieval of the call when the call is in a parked-call status.

It will be appreciated that the types of screen shot designs used in the present disclosure are merely representative for illustrating non-limiting examples of the present disclosure. Other screen shot designs and types of context, actions, etc. may be shown. Further, for each such example different visually-ornamental characteristics may be embodied in the screenshot irrespective of what is shown by way of FIGS. 4A-4D. More specifically and as applied to examples in FIGS. 4C and 4D, the specifically-indicated department names may be different and likely abbreviated, and different forms of extensions and numbers may be used such as with nicknames common to all users and/or from each user's contacts. If from each user's contacts, the server or each endpoint device may track/convert for the correlation between these different nicknames. Further, via authorized personnel (administrator or user with validated login credentials) of the GUI, and the CPU-based (phone-enabled) device with the display, etc., the user may manipulate the displayed or otherwise-provided information (e.g., such information sets and/or the screen shots) so as to rearrange and/or modify the information sets or entire screen shots so that different ones of information sets or entire screen shots are displayed together on the display, on adjacent displays, and/or so as to rearrange the information sets of each one or more single screen shots in different manners. Such authorized personnel may be given options on how to effect such manipulation via a settings profile which may be specific to the user, to the user's employer and/or to designated administrator types (such as client department head associated with a department name on the displayed screen shot).

It is understood that the various examples may be adapted for use with computer servers configured to provide various other remote services, including, but not limited to: various types of data communication services for endpoints linked to client accounts, website hosting, remote data storage, remote computing services, virtual computing environments, enterprise communications, virtual contact center and other services.

It will also be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a data communications endpoint device (or "endpoint") refers to or includes a communications circuit such as one that is enabled to communicate over a broadband network, that includes computer processing circuits configured to establish data-communications sessions with network (e.g., edge) servers and other endpoint devices including, for example, one or more of personal computers, IP-enabled mobile phones, and tablet computers. In more specific aspects of the above examples, a skilled artisan may appreciate that each such endpoint devices may include or refer to a smartphones, laptops, stand-alone CPUs, Internet-enabled desk-top phones, tablet computers, a CPU terminal, a smartwatch, etc., and in certain instances such endpoint devices may include or refer to contact-center CPU terminals controlled and observed manually or autonomously by a switchboard operator on behalf of a client entity.

Also, a client entity may refer to or include a set of one or more endpoint devices (as above) and/or respective users of the set of endpoint device(s) being associated with an organization (e.g., a club or company) where the entity or associated set of endpoint devices are registered for receiving services from the data-communications server (aka data-center communications server) which is to provide such services. Further, a data-center communications server or data-communications server refers to or includes a computer processing circuit that is configured to provide data-communications services to other circuit-based devices. A message recording system refers to or includes processing circuits configured to record a voice message. In certain embodiments, such a processing circuit includes or refers to logic circuitry and/or one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes).

As further examples according to the present disclosure, various specific methods relating to the above-described aspects may involve a computer program product (e.g., non-volatile memory device), which includes a machine or computer-readable medium having stored thereon instructions which may be executed by a computer (or other electronic device) to perform these operations/activities. In certain such CPU-related embodiments, a programmable circuit may be used as one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). For example, a method consistent with the above-characterized aspects may have instructions for use by computer-based and/or logic circuitry (e.g., a data-communications server and related logic circuitry) with the instructions stored on a computer-readable device (endpoint device, memory stick, etc.). For example, for one such method corresponding to the present disclosure, when such stored instructions are executed by the circuitry, the following steps may be carried out: storing client-specific sets of data which respectively indicate, for each of a plurality of remotely-situated disparate client entities ("client entities"), data-communications services including data-communications call routing services and parked-call services to be provided on behalf of the client entity from among the client entities; accessing the client-specific sets of data and, in response, receiving incoming calls involving user endpoint devices associated with respective ones of the client entities and providing the data communications services to the client entities in a manner consistent with the client-specific sets of data; and for an incoming call from among the incoming calls, conveying one of multiple call-related context indications to one of the user endpoint devices, for informing on how the incoming call may be processed for a change to or from a parked call status.

Also activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, engines, modules, devices, units, controllers, and the like. In these discussions of various examples, such terms (and not necessarily limited to "block", "module" or "engine") refers to or includes circuitry (e.g., "logic circuitry" and/or data-processing circuits including one or more computers) that performs or carries out one or more of these or related operations/activities. As an example, a communication control circuit such as a network-based server includes logic and data processing circuitry to enable the server to receive and send data over the network. In another examples, in certain of the above-discussed embodiments, one or more modules may be discrete logic circuits, computer processing circuits, or programmable logic circuits configured and arranged for implementing these operations/activities, as in the blocks shown in the figures.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A system comprising:
a memory circuit including client-specific sets of data which respectively indicate, for each of a plurality of remotely-situated disparate client entities ("client entities"), data communications services including data-communications call routing services and parked-call services to be provided on behalf of a client entity from among the client entities;
a data-communications server, including one or more computer processor circuits and one or more data communication circuits, to
access the client-specific sets of data stored in the memory circuit,
in response, receive incoming calls involving user endpoint devices associated with respective ones of the client entities provide the data communications services involving the incoming calls to the client entities in a manner consistent with the client-specific sets of data; and convey for an incoming call from among the incoming calls, one of multiple call-related context indications to one of the user endpoint devices, for informing on how the incoming call ("the call") may be processed for a change to or from a parked call status.

2. The system of claim 1, wherein said one of multiple call-related context indications is to convey one of different possible contexts associated with said one of the user endpoint devices that is registered in the memory circuit to receive the data communications services.

3. The system of claim 2, wherein the different possible contexts include one or more of: an endpoint-device user availability status; and a geographical-location status for an endpoint-device user.

4. The system of claim 1, wherein at least one of different possible contexts includes a filtered status associated with data involving the call, wherein the filtered status refers to or includes the call being deemed as being of a certain level of importance or as having a certain priority for changing the call to or from a parked call status, and the data-communications server is to convey an indication of the certain level of importance or certain priority.

5. The system of claim 1, wherein at least one of different possible contexts includes a filtered status associated with data involving the call, wherein the filtered status is linked to a certain topic or certain subject matter, and the data-communications server is to convey an indication of the certain topic or certain subject matter.

6. The system of claim 1, further including data-processing circuitry to perform at least one of IVR (interactive voice recognition) operations or call content analysis while the data-communications server monitors the call before causing the call to be parked, and in response to discern information from the call which indicates that the call should not be in a parked-call status at all or in a parked-call status beyond a certain time threshold.

7. The system of claim 1, further including data-processing circuitry, to discern information from the call which indicates that a certain follow-up action is to be taken in connection with retrieval of the call from a parked-call status, and wherein the data-communications server is to convey an indication of the certain follow-up action.

8. The system of claim 1, further including data-processing circuitry to discern information from the call which indicates that a certain action is to be taken in connection with retrieval of the call from a parked-call status, wherein the certain action is one or more of: forwarding or handing off the call to a certain individual or group, and routing the call to a destination address or endpoint device, and wherein the data-communications server is to convey an indication of the certain action.

9. The system of claim 1, further including data-processing circuitry to discern information from the call that includes or indicates a filtered status corresponding to caller identification data for the call, wherein the filtered status is based on one of geo-location of a callee and availability of the callee.

10. The system of claim 1, further including data-processing circuitry to discern information from the call that includes or indicates at least one of: a topic, an action, and a name derived from data previously stored by the system, and wherein the data-communications server is to convey data indicative of the discerned information to provide an insight while the call is parked or being retrieved from parked-call status.

11. The system of claim 1, further including data-processing circuitry to discern information from the call including one or more of: a filtered status corresponding to caller identification data for the call including one of geo-location of a callee and/or the caller and availability of the callee; and a term corresponding to a topic recognized from data previously stored by the system and deemed likely useful to provide an insight about the call; and wherein the data-communications server is to convey data indicative of the discerned information to provide an insight while the call is parked or being retrieved from parked-call status.

12. The system of claim 1, further including data processing circuitry to discern front-end information from the call including at least one of ID data relating to the caller and/or call, and data to identify a topic or subject matter surrounding the call.

13. The system of claim 12, further including a content analysis engine to use the discerned front-end information for retrieving from the memory circuit, and to prompt the data-communications server to convey an insight for handling the call upon retrieval of the call from a parked-call status.

14. The system of claim 1, wherein the data-communications server is to communicate with a graphic user interface (GUI) circuit of said one of the user endpoint devices which has a display on which data is provided for said informing on how the incoming call may be processed for a change to or from a parked call status.

15. The system of claim 1, wherein the data-communications server is to process, by routing and/or parking, calls of different types and via different respectively-corresponding communications channels, wherein the different types of calls and different respectively-corresponding communications channels include at least two of: a VoIP (Voice over Internet Protocol) channel for audio calls, a chat message channel for sending chat messages, an SMS channel for text messaging, an email channel for communicating emails, a MMS channel for multimedia messaging; and one or more channel for conducting a multi-party meeting involving communications of audio and/or multi-media by at least three endpoint devices respectively located at least three different locations.

16. The system of claim 15, wherein the data-communications server is to convey one of multiple call-related context indications to one of the user endpoint devices, for informing on how the incoming call may be processed relative to a change to or from a parked call status based at least in part on one of the different types of calls and different respectively-corresponding communications channels on which the incoming call is received by the data-communications server.

17. The system of claim 15, wherein the data-communications server is to convey one of multiple call-related context indications to one of the user endpoint devices, for informing on how the incoming call may be processed relative to a change to or from a parked call status based at least in part on a user preference of one of the different types of calls and different respectively-corresponding communications channels on which a parked call is to be retrieved.

18. The system of claim 15, further including data processing circuitry to prompt the data-communications server to convey that a caller ID is linked to another endpoint device which should be used with retrieval of the call being in a parked-call status.

19. The system of claim 1, wherein the data-communications server is to communicate with a graphic user interface (GUI) circuit of said one of the user endpoint devices, said GUI circuit including a display and user-input circuitry to receive user data for selecting options for processing the call upon retrieval from a parked-call status.

20. A method comprising:
storing client-specific sets of data which respectively indicate, for each of a plurality of remotely-situated disparate client entities ("client entities"), data communications services including data-communications call routing services and parked-call services to be provided on behalf of a client entity from among the client entities;

via a data-communications server which includes one or more computer processor circuits and one or more data communication circuits, accessing the client-specific sets of data and, in response, receiving incoming calls involving user endpoint devices associated with respective ones of the client entities and providing the data communications services to the client entities in a manner consistent with the client-specific sets of data; and for an incoming call from among the incoming calls, conveying one of multiple call-related context indications to a user endpoint device from among the user endpoint devices, for informing on how the incoming call ("the call") may be processed for a change to or from a parked call status.

21. The method of claim 20, further including discerning information and including the discerned information with the said one of multiple call-related context indications to the user endpoint device, the discerned information being based on identification data regarding a caller or an endpoint device of a caller which initiated the call and/or on a topic or insight relating to a likely issue involving the call.

22. The method of claim 20, further including using the one of multiple call-related context indications to process the call by causing the change to or from a parked call status by causing the call to be processed by an IVR (Interactive Voice Recognition) process and/or by a scheduling engine configurable to prompt a follow-up action.

23. The method of claim 20, further comprising using the data-communications server to communicate with a graphic user interface (GUI) circuit of said one of the user endpoint devices which has a display on which data is provided for said informing on how the incoming call may be processed for a change to or from a parked call status, and on which there are displayed selectable icons or components from which a user of the display provides feedback on how the incoming call is to be processed in response to said informing on how incoming call may be processed.

24. A storage device including computer instructions which, in response to being executed by a computer-based circuit, cause a method to be carried out, the method including the steps of:

storing client-specific sets of data which respectively indicate, for each of a plurality of remotely-situated disparate client entities ("client entities"), data communications services including data-communications call routing services and parked-call services to be provided on behalf of a client entity from among the client entities;

accessing the client-specific sets of data and, in response, receiving incoming calls involving user endpoint devices associated with respective ones of the client entities and providing the data communications services to the client entities in a manner consistent with the client-specific sets of data; and for an incoming call from among the incoming calls, conveying one of multiple call-related context indications to one of the user endpoint devices, for informing on how the incoming call may be processed for a change to or from a parked call status.

\* \* \* \* \*